(12) United States Patent
Randell et al.

(10) Patent No.: US 8,086,788 B2
(45) Date of Patent: Dec. 27, 2011

(54) MEMORY CONTROLLER INTERFACE

(75) Inventors: Jerrold R. Randell, Waterloo (CA);
Richard C. Madter, Puslinch (CA);
Karen Alicia Werder, Kitchener (CA)

(73) Assignee: Research In Motion Limited, Waterloo (CA)

( * ) Notice: Subject to any disclaimer, the term of this patent is extended or adjusted under 35 U.S.C. 154(b) by 0 days.

(21) Appl. No.: 12/559,133

(22) Filed: Sep. 14, 2009

(65) Prior Publication Data

US 2010/0005232 A1 Jan. 7, 2010

Related U.S. Application Data

(62) Division of application No. 11/051,491, filed on Feb. 4, 2005, now Pat. No. 7,610,433.

(60) Provisional application No. 60/542,207, filed on Feb. 5, 2004.

(51) Int. Cl.
*G06F 13/14* (2006.01)

(52) U.S. Cl. ........ 711/103; 711/101; 711/104; 711/106; 711/154

(58) Field of Classification Search .................. 711/103, 711/101, 104, 106, 154
See application file for complete search history.

(56) References Cited

U.S. PATENT DOCUMENTS

| | | | |
|---|---|---|---|
| 5,761,695 A * | 6/1998 | Maeda et al. | 711/5 |
| 5,937,433 A * | 8/1999 | Lee et al. | 711/158 |
| 6,012,141 A | 1/2000 | Isaman | |
| 6,263,399 B1 | 7/2001 | Hwang | |
| 6,338,119 B1 * | 1/2002 | Anderson et al. | 711/135 |
| 6,625,729 B1 | 9/2003 | Angelo et al. | |
| 7,051,184 B2 * | 5/2006 | Lane | 711/220 |
| 2002/0027830 A1 | 3/2002 | Tsuchida et al. | |
| 2002/0056022 A1 | 5/2002 | Leung | |
| 2002/0099950 A1 | 7/2002 | Smith | |
| 2002/0118593 A1 | 8/2002 | Takemae | |
| 2002/0184579 A1 | 12/2002 | Alvarez et al. | |
| 2003/0050087 A1 | 3/2003 | Kwon | |
| 2003/0140238 A1 | 7/2003 | Turkboylari | |
| 2003/0156454 A1 | 8/2003 | Wei et al. | |
| 2003/0172261 A1 * | 9/2003 | Lee et al. | 713/1 |
| 2004/0059846 A1 * | 3/2004 | Liu et al. | 710/62 |
| 2005/0102444 A1 | 5/2005 | Cruz | |

FOREIGN PATENT DOCUMENTS

| | | |
|---|---|---|
| JP | 57-108937 | 7/1982 |
| JP | 2003-058420 A2 | 2/2003 |
| JP | 2004-272870 A1 | 9/2004 |
| WO | 02/01364 A2 | 1/2002 |
| WO | 2004003759 A1 | 1/2004 |

\* cited by examiner

*Primary Examiner* — Yong Choe
(74) *Attorney, Agent, or Firm* — Jenna L. Wilson; Dimock Stratton LLP

(57) ABSTRACT

A memory interface controller and method to allow a processor designed and configured to operate with NOR flash and static random access memory SRAM devices to instead operate using NAND flash and synchronous dynamic random access memory SDRAM. The system accomplishes this by caching sectors out of NAND flash into SDRAM, where the data can be randomly accessed by the processor as though it were accessing data from NOR flash/SRAM. Sectors containing data required by the processor are read out of NAND flash and written into SDRAM, where the data can be randomly accessed by the processor.

17 Claims, 20 Drawing Sheets

| Address Offset (1) MCU_ADDR[15:0] | Reference | Description | Size |
|---|---|---|---|
| 0x0000 | CCM_TAGRAM | CCM Cache Tags | 32KB |
| 0x8000 | RWB_RBUF | RWB Read Buffer | 8KB region, uses 0.5KB |
| 0xA000 | CCM_DIRFIFO | Directory Fifo SRAM | 8KB region, uses ?KB |
| 0xC000 | AIC_ADDR | AIC Address Space | 8KB region, uses 32B |
| 0xE000 | CRBASE | CR Address Space | 8KB region |

NOTES:
(1) This Address Offset is added to the base address (BASE) as define below.
   BASE is defined as the top of the chip select minus 64KB.
   There are three cases:
      ADDR(22:0), BASE = 0x07F0000.
      ADDR(23:0), BASE = 0x0FF0000.
      ADDR(24:0), BASE = 0x1FF0000.

(2) Note that the RWB Write Buffer is located from 2KB to 10KB on CS0, not here with the rest of the SRAMs.

(3) The SCM registers numbers 0, 2 and 3 (within the CR address space) are asynchronous and can be manipulated without the PLL being setup. SCM register 1 (the status register) and the rest of the CR/SRAM/AIC space requires the PLL to be in operation.

FIG. 5

| Address Offset (1) MCU_ADDR[12:0] | Reference | Description | Size |
|---|---|---|---|
| 0x0000 | RWB_BASE | RWB Configuration | 0.5KB |
| 0x0200 | CCM_BASE | CCM Configuration | 0.5KB |
| 0x0400 | AES_BASE | AES Configuration | 0.5KB |
| 0x0600 | ECC_BASE | ECC Configuration | 0.5KB |
| 0x0800 | NA | NA | 0.5KB |
| 0x0A00 | SEC_BASE | SEC Configuration | 0.5KB |
| 0x0C00 | NIC_BASE | NIC Configuration | 0.5KB |
| 0x0E00 | SIC_BASE | SIC Configuration | 0.5KB |
| 0x1000 | AIC_BASE | AIC Configuration | 0.5KB |
| 0x1200 | MIC_BASE | MIC Configuration | 0.5KB |
| 0x1400 | MIG_BASE | MIG Configuration | 0.5KB |
| 0x1600 | TDE_BASE | TDE Configuration | 0.5KB |
| 0x1800 | SCM_BASE | SCM Configuration (some async) | 0.5KB |
| 0x1A00 | IPC_BASE | IPC Configuration | 0.5KB |

FIG. 6

| PAGE | CHIP SELECT | ADDRESS (23:0) |
|---|---|---|
| 0 | 3 | 0x0000000 (0MB) |
| 1 | 3 | 0x0400000 (4MB) |
| 2 | 3 | 0x0800000 (8MB) |
| 3 | 1 | 0x0C00000 (12MB) |
| 4 | 1 | 0x0800000 (8MB) |

FIG. 7

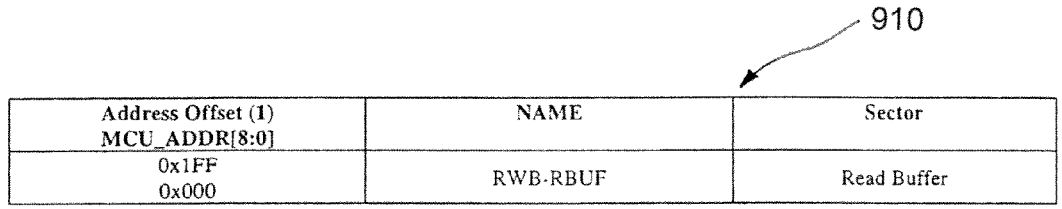
FIG. 10
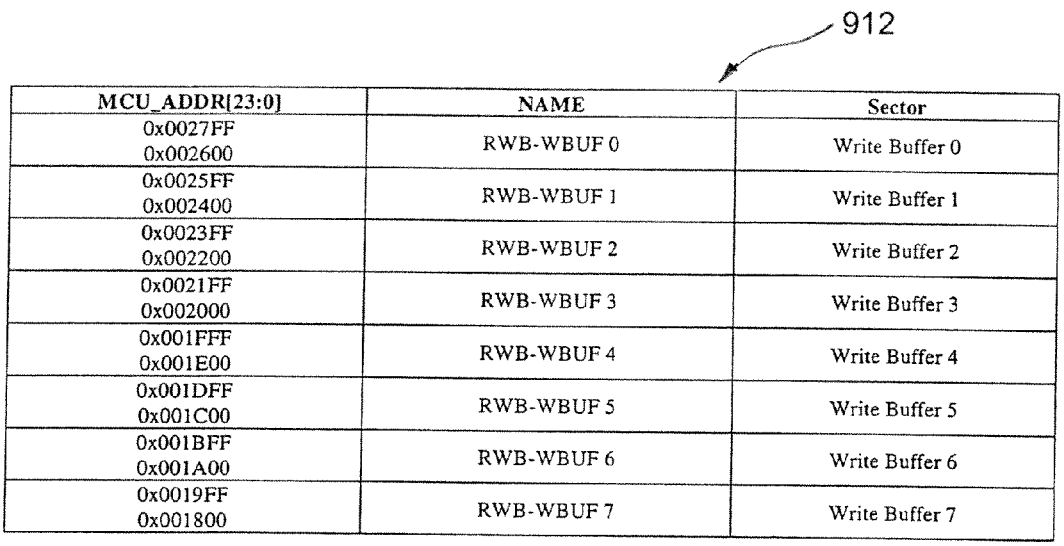
FIG. 11
| OTP Flag | Boot Sector Write-able | Boot Sector Erasable |
|---|---|---|
| 0 | Yes | Yes |
| 1 | No | No |
FIG. 12

| Transaction | 15 | 14 | 13 | 12 | 11 | 10 | 9 | 8 | 7 6 5 4 3 2 1 0 |
|---|---|---|---|---|---|---|---|---|---|
| | Cmd Val | - | Data Write | Data Cycle Req'd | Reg To Cell | Cell To Reg | Row Addr Req'd | Col Addr Req'd | Command Code (in Hexadecimal format) |
| Reset | 1 | X | X | 0 | 0 | 1* | 0 | 0 | FF |
| Read Mode 1 | 1 | X | 0 | 1 | 0 | 1 | 1 | 1 | 00 |
| Read Mode 2 | 1 | X | 0 | 1 | 0 | 1 | 1 | 1 | 01 |
| Read Mode 3 | 1 | X | 0 | 1 | 0 | 1 | 1 | 1 | 50 |
| Serial Data In | 1 | X | 1 | 1 | 0 | 0 | 1 | 1 | 80 |
| Auto Program (True) | 1 | X | X | 0 | 1 | 0 | 0 | 0 | 10 |
| Auto Program (Dummy) | 1 | X | X | 0 | 1 | 0 | 0 | 0 | 11 |
| Auto Program (Multi Block) | 1 | X | X | 0 | 1 | 0 | 0 | 0 | 15 |
| Auto Block Erase | 1 | X | X | 0 | 0 | 0 | 1 | 0 | 60 |
| Auto Block Erase (True) | 1 | X | X | 0 | 1 | 0 | 0 | 0 | D0 |
| Status Read 1 | 1 | X | 0 | 1 | 0 | 0 | 0 | 0 | 70 |
| Status Read 2 | 1 | X | 0 | 1 | 0 | 0 | 0 | 0 | 71 |
| ID Read 1 | 1 | X | 0 | 1 | 0 | 1** | 0 | 1 | 90 |
| ID Read 2 | 1 | X | 0 | 1 | 0 | 1** | 0 | 1 | 91 |

\* Although there is no occurrence of a memory cell to register transfer in a reset operation, the CellToReg attribute is set to invoke the hardware detection of NAND Flash memory Ready/Busyn signal in the NIC.
\*\* ID Reads do not require NAND flash memory to perform a cell to register transfer. However, the Cell2Reg attribute is set to produce the ID Read timing parameter ALE low to REb low (tAR1).

FIG. 14

| Address Offset (1) MCU_ADDR[4:0] | NAME | Contents |
|---|---|---|
| 0x0 | SIC_ACCESS_CR | Control Register |
| 0x2 | SIC_REFRESH_CR | Control Register |
| 0x4 | SIC_LOAD_MODE | Control Register |
| 0x6 | SIC_SDRAM_CONTROL_STATUS | Control and Status Register |
| 0xE | SIC_TEST_MODE | Test Mode Register |

NOTES:
(1) This Address Offset is added to the SIC base address (SIC_BASE) as define by the MIC in Table 5.2-29.

FIG. 16

| FUNCTION | CSn | RASn | CASn | WEn | CKE | Address | DQM(1:0) | DQ(15:0) |
|---|---|---|---|---|---|---|---|---|
| Command Inhibit | '1' | 'x' | 'x' | 'x' | '1' | X | X | X |
| No Operation | '0' | '1' | '1' | '1' | '1' | X | X | |
| ACTIVE | '0' | '0' | '1' | '1' | '1' | BA/Row | X | |
| READ | '0' | '1' | '0' | '1' | '1' | BA/Col | | |
| WRITE | '0' | '1' | '0' | '0' | '1' | BA/Col | | Data In |
| Burst Terminate | '0' | '1' | '1' | '0' | '1' | X | X | |
| PRECHARGE | '0' | '0' | '1' | '0' | '1' | Code | X | |
| AutoRefresh | '0' | '0' | '0' | '1' | '1' | X | X | |
| Self Refresh | '0' | '0' | '0' | '1' | '0' | X | X | |
| Load Mode Register | '0' | '0' | '0' | '0' | '1' | Op-Code | X | |

FIG. 17

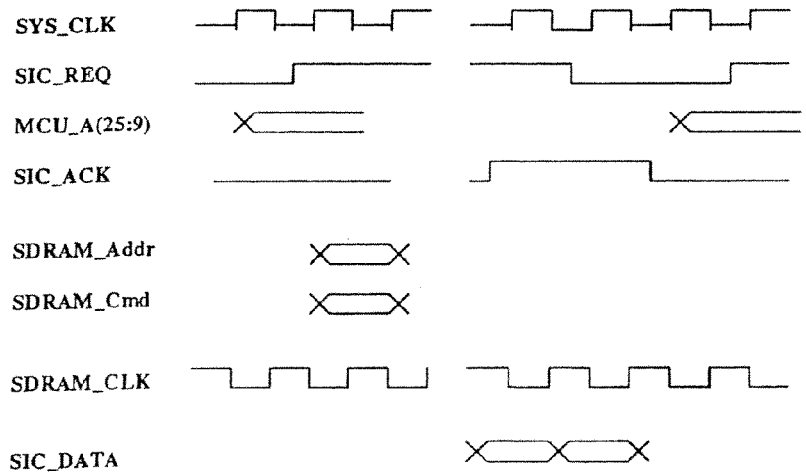

FIG. 18

MEMORY CONTROLLER INTERFACE

REFERENCE TO PRIOR APPLICATIONS

This application is a divisional of U.S. application Ser. No. 11/051,491, filed Feb. 4, 2005, which claims priority from U.S. Application No. 60/542,207, filed Feb. 5, 2004.

BACKGROUND

1. Technical Field

This application relates generally to data processing systems. In particular, this application relates to an interface that enables a processor designed to support NOR flash and static random access memory SRAM devices to use NAND flash and synchronous dynamic random access memory SDRAM components.

2. Description of Related Art

Handheld data processing devices, sometimes known as "personal digital assistants", are becoming very popular tools for information storage and retrieval, messaging and other functions. Such devices have the ability to store a significant amount of data, including calendar, address book, tasks and numerous other types of data for business and personal use. Most handheld data processing devices have the ability to connect to a personal computer for data exchange, and many are equipped for wireless communications using, for example, conventional email messaging systems.

Cost and space are two significant limiting parameters in handheld data processing devices. As a general rule, reducing the number of chips required by the device also reduces the cost and size of the device, and in some cases energy consumption.

A typical handheld data processing device has a processor for processing the data, which accesses data from a NOR flash chip, which is a non-volatile memory storage device that retains data even when no power is being supplied to the chip. Typically the processor caches data read from NOR flash in SRAM, which is a volatile storage device that retains data only when power is being supplied to the chip (i.e. when the handheld data processing device is on). Accordingly, the processor in conventional handheld data processing devices is designed and programmed to read data from NOR flash and write the data to SRAM for use or modification; and to read data from SRAM and write modified data to NOR flash for long term storage.

Another type of non-volatile memory, known as NAND flash, contains more memory density than a comparable NOR flash chip. NAND flash memory is less expensive than NOR flash; however, whereas data is read out of and written to NOR flash memory one byte at a time, data must be read out of and written to NAND flash memory in blocks or "sectors" of data. For example, reading a 16-bit data value stored in NOR flash requires one read access to the flash device, whereas to read the same 16-bit value from NAND flash requires reading out an entire 512 byte sector. Also, their interfaces are different. The two major differences between SRAM and SDRAM is that SDRAM consumes more energy due to the need for constant refresh operations, and their interfaces are also different.

It is therefore not possible for an existing processor in a handheld data processing device, which is designed to write and read individual bytes, to utilize a NAND flash memory. Even if the processor had NAND flash and SDRAM interfaces, the software architecture would need to be completely redesigned to handle the sector based NAND memory architecture. With its existing software architecture the processor will be unable to process data from NAND flash during normal operation of the device, and would not even be able to boot up because it would not be able to process the boot-up routine. To reconfigure the processor so that it could boot and run using a NAND flash chip, the architecture of the processor would need to be drastically changed, which is an extremely expensive and time consuming process.

Further, in some cases processing speed is also an important feature of a handheld data processing device. Because in a conventional handheld data processing device data is read by the processor from NOR flash and written by the processor to SRAM, and vice versa, the processing speed is reduced by these read and write operations. Further, in a conventional handheld data processing device the LCD display is connected directly to the main processor bus, which also reduces processing speed because of the increased capacitance experienced by the processor on the main bus.

It would accordingly be advantageous to provide an interface which allows an existing NOR flash SRAM-based processor in a handheld data processing device to operate using NAND flash/SDRAM memory components. It would further be advantageous to provide an interface which handles memory control to avoid reductions in the processor's speed caused by read and write operations. It would further be advantageous to provide an interface which handles auxiliary devices, such as the display, to avoid reductions in the processor's speed caused by including a large capacitive interface on the main processor bus.

SUMMARY

In accordance with an aspect of the invention, a memory interface controller is provided for enabling a processor designed to support NOR flash and SRAM components to use NAND flash and SDRAM, wherein sectors of the SDRAM comprise a cache for storing data read from sectors of NAND flash. The controller comprises a cache controller module for managing the flow of data between the NAND flash and SDRAM, a read-write buffer in communication with the cache controller module and with interface controllers for the NAND flash and SDRAM, respectively, for buffering data read or written between the cache and the NAND flash memory, a cache tag memory for storing at least one tag entry for correlating a sector of cache with a sector of NAND flash, such that when a processor requests data from the NAND flash, the memory interface controller is capable of accessing the appropriate data sector from the NAND flash, reading the requested data, and writing the data using the read-write buffer to a sector of the cache for future processor requests for said data sector.

In a further aspect, the cache tag memory is contained in the SRAM, and at least one tag entry comprises at least one modified sector bit for indicating whether a sector in the cache comprises modified data. In a further aspect, the controller also comprises an error correction coding module in communication with the read-write buffer and the interface controller for the NAND flash for computing check codes to be written to the NAND flash and for verifying and correcting data as it is read back from the NAND flash, and an encryption module for encrypting data before it is written from the cache to the NAND flash and for decrypting data read from the NAND flash before it is written to the cache.

Still another aspect is that the read-write buffer comprises at least one read buffer for storing data retrieved from NAND flash to be written to the cache, and at least one write buffer for storing data retrieved from SDRAM to be written to NAND flash. The read-write buffer may comprise SRAM. The memory interface controller is able to interface to NAND flash components having an either 8-bit or 16-bit wide data bus. The processor may comprise an asynchronous or burst memory interface.

In a further aspect, a method for retrieving data from a NAND flash component for a processor designed to support NOR flash and SRAM components is provided, comprising receiving an access request for data stored in NAND flash from the processor; identifying the sector of the NAND flash comprising the requested data; checking at least one tag entry to determine if the data of the identified sector had been previously stored in a cache provided by a SDRAM component; if the data of the identified sector had not been previously stored in the cache, then reading the requested data from the NAND flash and writing the requested data to the cache; and responding to the access request by reading the data corresponding to the identified sector from the cache. Yet another aspect is that if the data of the identified sector had not been previously stored in the cache, then the method determines the data of the identified sector had not been previously stored in the cache; if cache space is available, the requested data is written to an available sector of the cache; if cache space is not available, then at least one tag entry is checked to determine if data in a sector of the cache is unmodified; and if a cache sector of unmodified data is thus identified, the cache sector with the requested data is overwritten.

In a further aspect, the method comprises the steps, if cache space is not available and no cache sector of unmodified data is identified, of reading out one or more sectors of modified data from the cache and writing said modified data to the corresponding sectors of NAND flash; and overwriting at least one of said cache sectors with the requested data. Further, in another aspect, in response to a processor request, data stored in an identified sector of the cache may be modified and written to the NAND flash. In a further aspect, when data stored in an identified sector of the cache is modified, a tag entry corresponding to the identified cache sector is set to indicate that the data has been modified; and when the modified data is written to the NAND flash, the tag entry corresponding to the identified cache sector is set to indicate that the data has not been modified.

An aspect of the invention is that the step of writing the modified data to the NAND flash may occur when all cache sectors contain modified data; a loss of power is detected; an autosave procedure is initiated; or the processor requests that modified data be written from the cache to the NAND flash. In a further aspect, error correction coding is performed on the requested data read from the NAND flash.

BRIEF DESCRIPTION OF THE DRAWINGS

In drawings which illustrate by way of example only a memory controller interface.

FIG. 5 is a memory map of CR/SRAM/AIC partitions in the SRAM emulation portion of SDRAM in for the memory controller interface of FIG. 3.

FIG. 6 is a Configuration Registers (CR) memory map for the memory controller interface of FIG. 3.

FIG. 7 is a table of page locations with respect to NAND chip selects for the memory controller interface of FIG. 3.

FIG. 10 is an RWB Read Buffer Map table for the RWB of FIG. 9.

FIG. 11 is an RWB Write Buffers Map table for the RWB of FIG. 9.

FIG. 12 is a One Time Programmable (OTP) Flag Definitions table for the memory controller interface of FIG. 3.

FIG. 14 is an NIC Command Code Attributes table for the NIC of FIG. 13.

FIG. 16 is an SIC Configuration table for the SIC of FIG. 15.

FIG. 17 is an SDRAM Command table for the SIC of FIG. 15.

FIG. 18 is a timing diagram for the SDRAM Interface Controller (SIC) for the SIC of FIG. 15.

DETAILED DESCRIPTION

Figure 1:
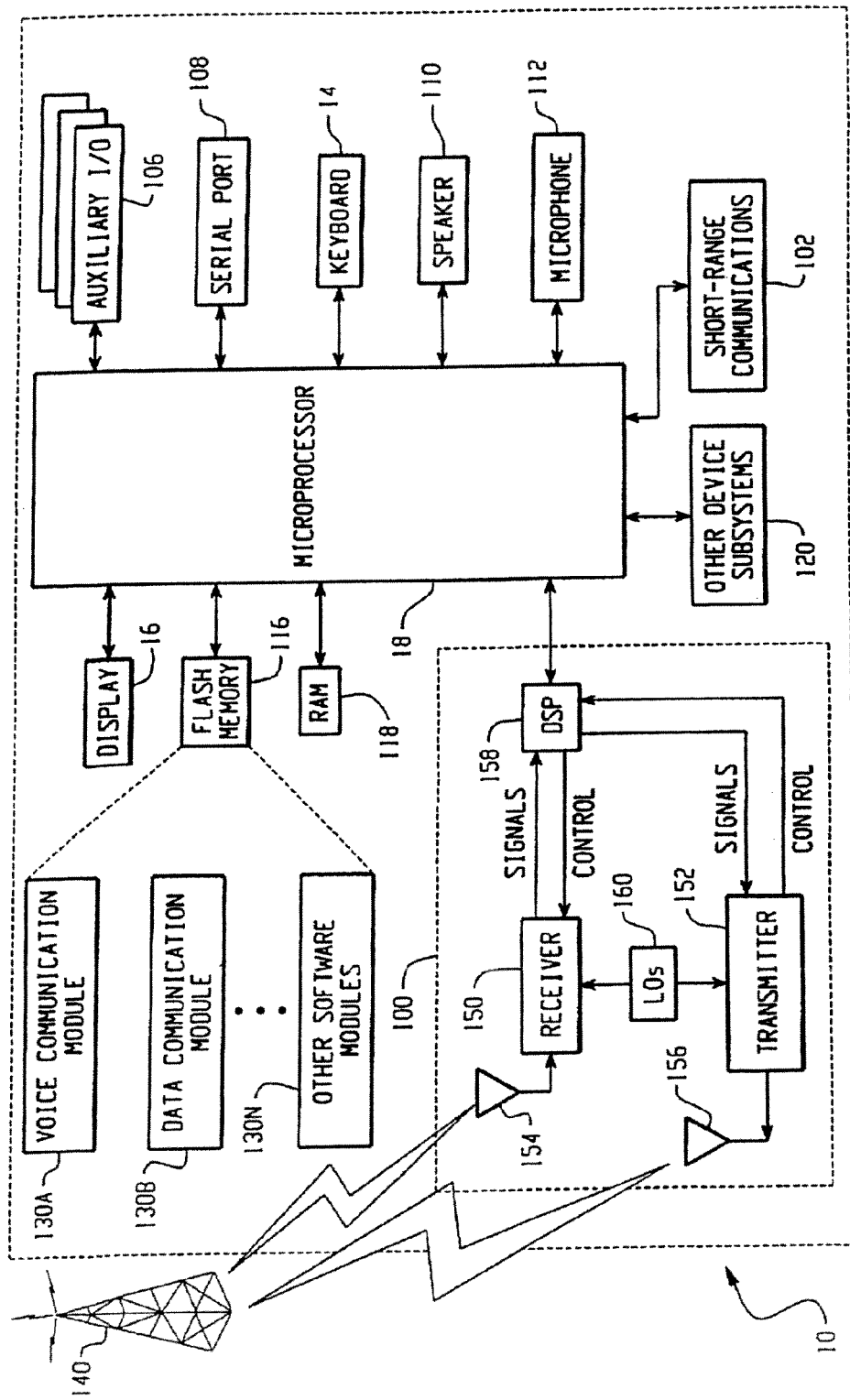
FIG. 1 is a block diagram of a system overview of a conventional hand-held data processing device.
Figure 2:
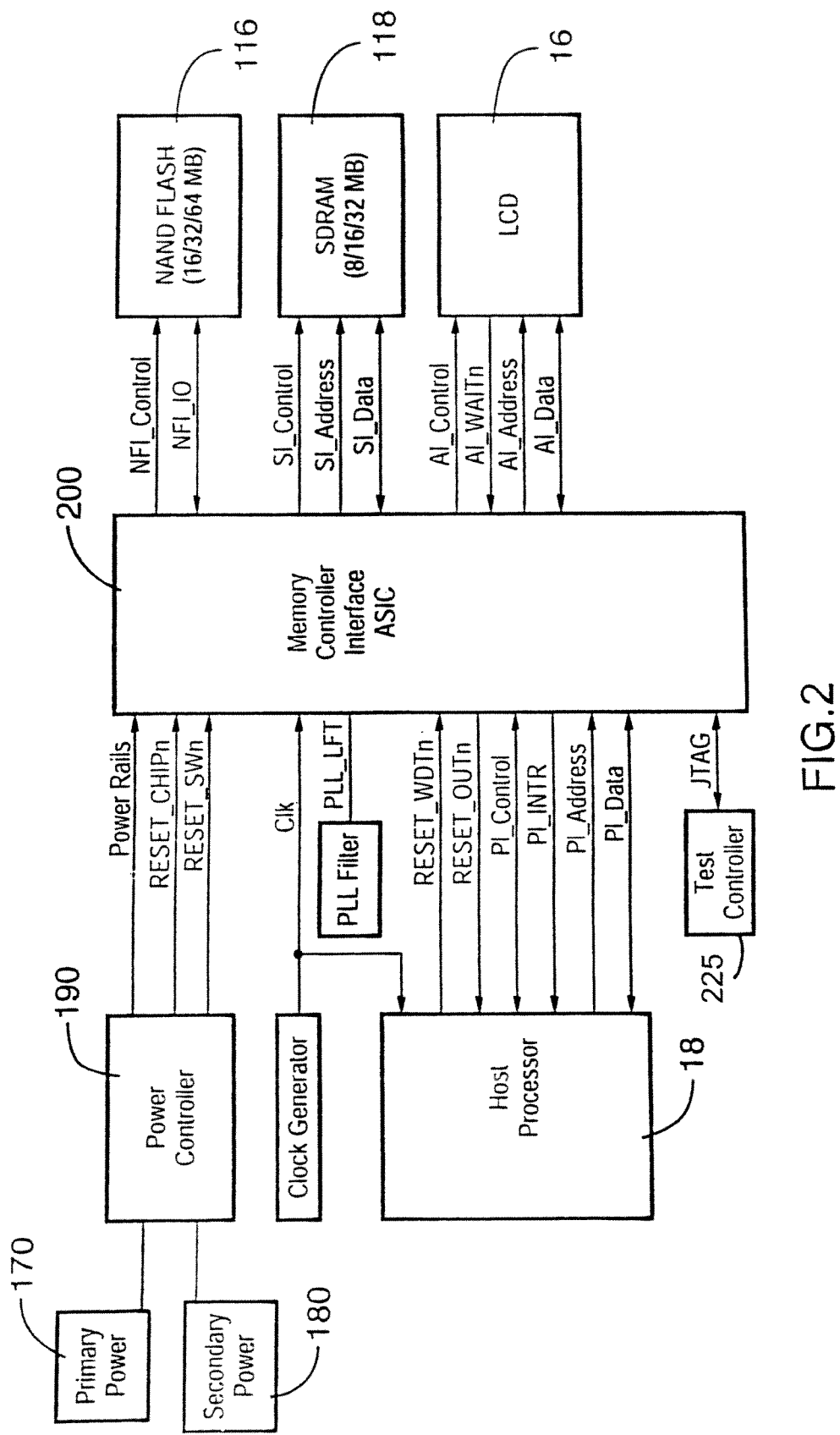
FIG. 2 is a system interface block diagram of a data processing device.
Figure 3A:
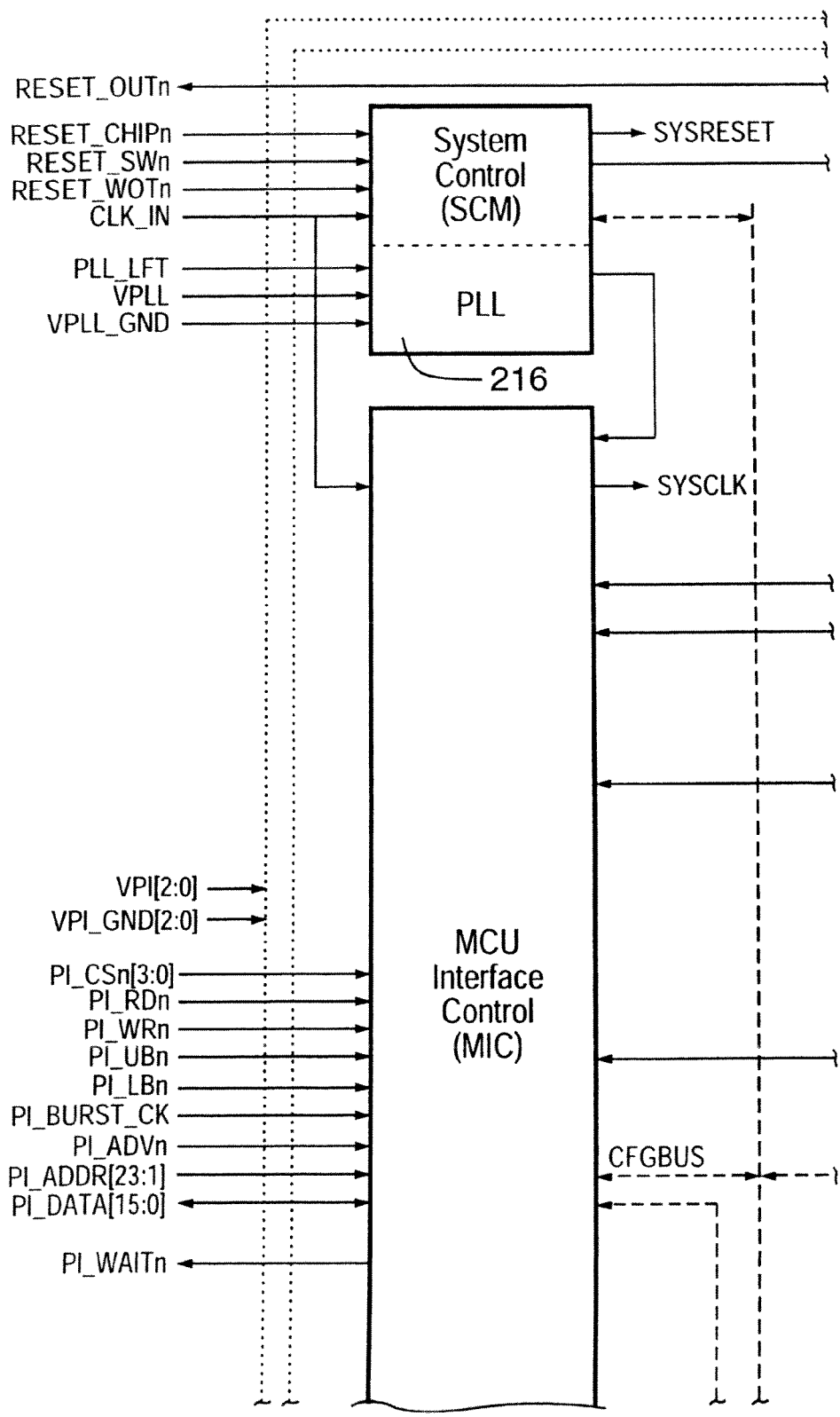
FIG. 3 and its constituent parts A through I are a detailed block diagram of the memory controller interface in the data processing device of FIG. 2.
Figure 3B:
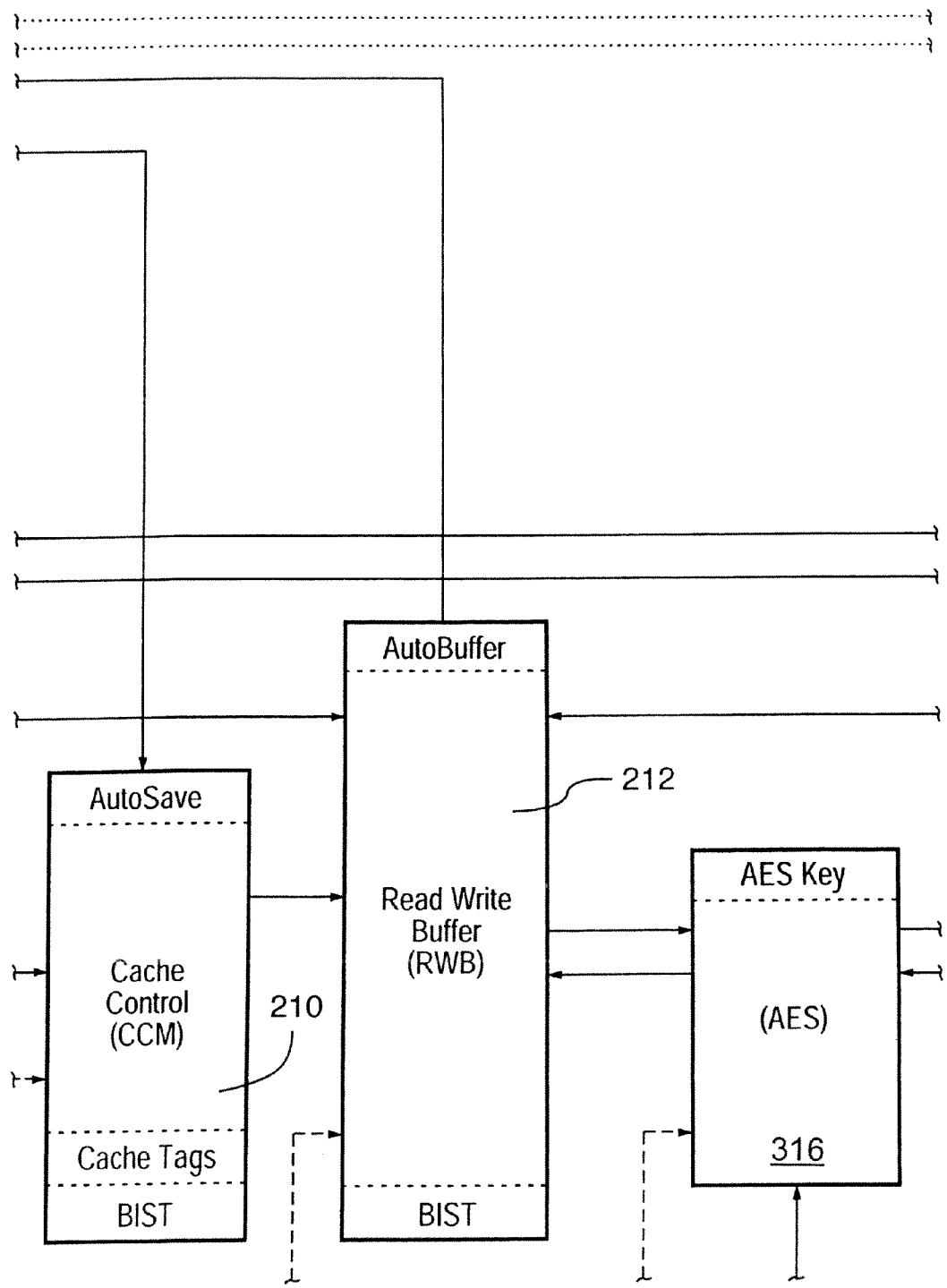
Figure 3C:
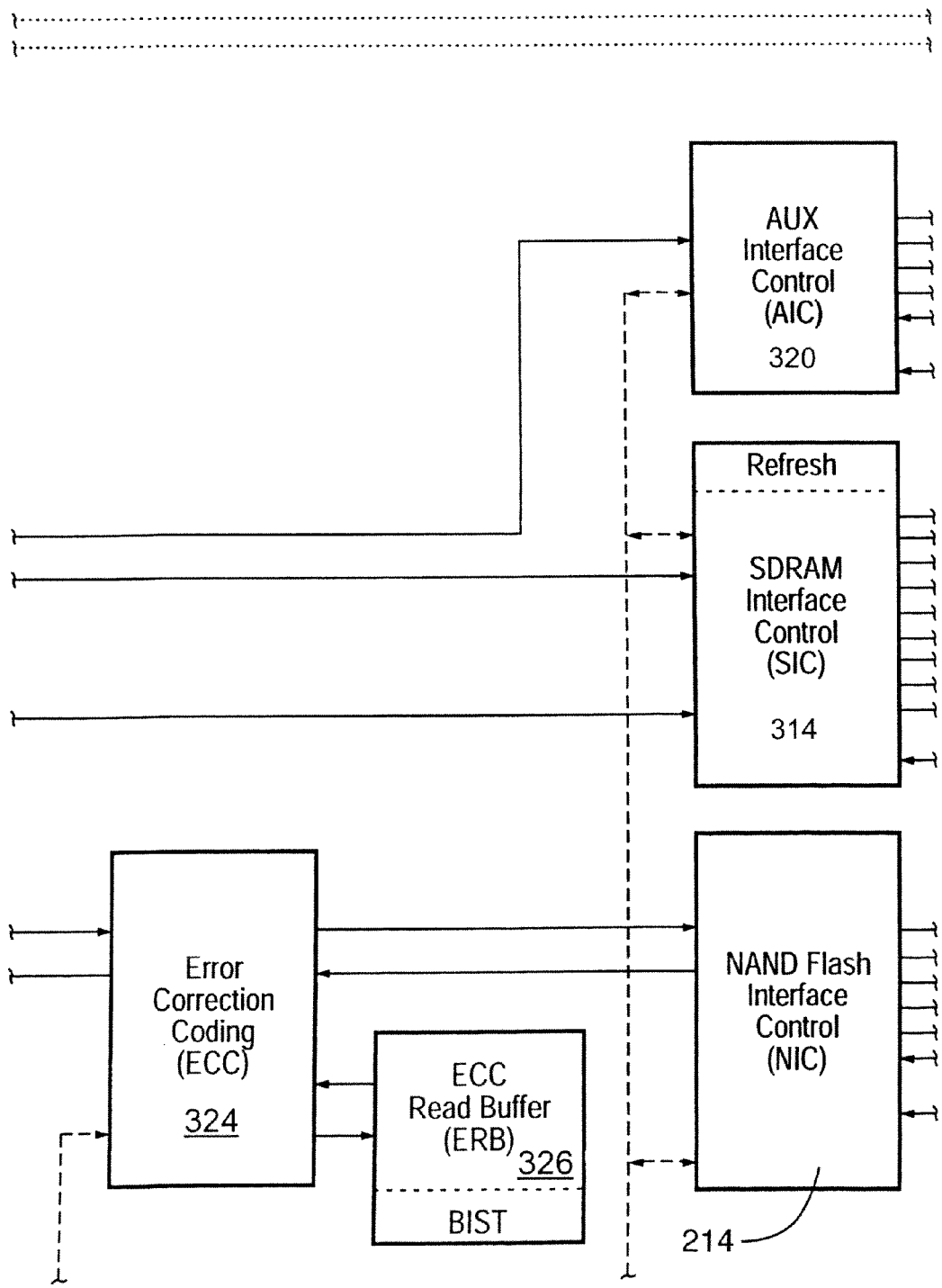
Figure 3D:
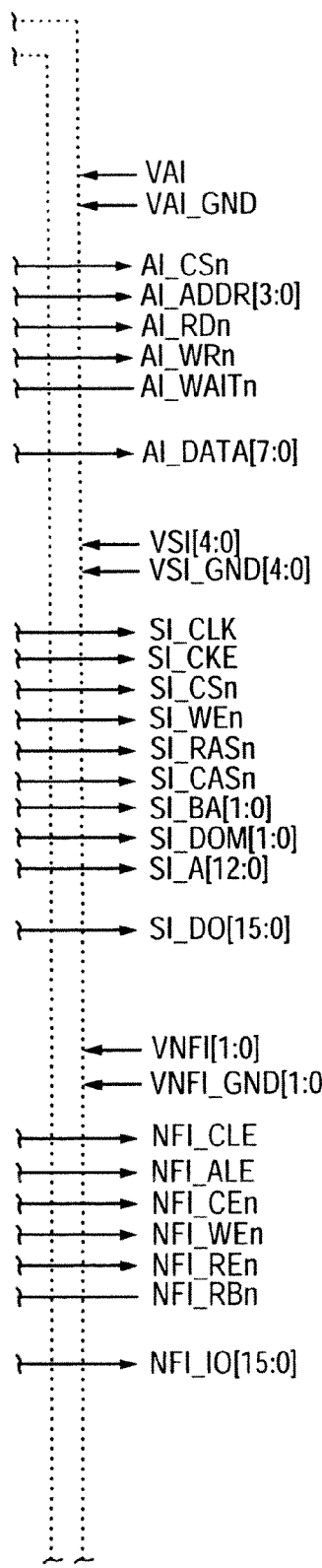
Figure 3E:
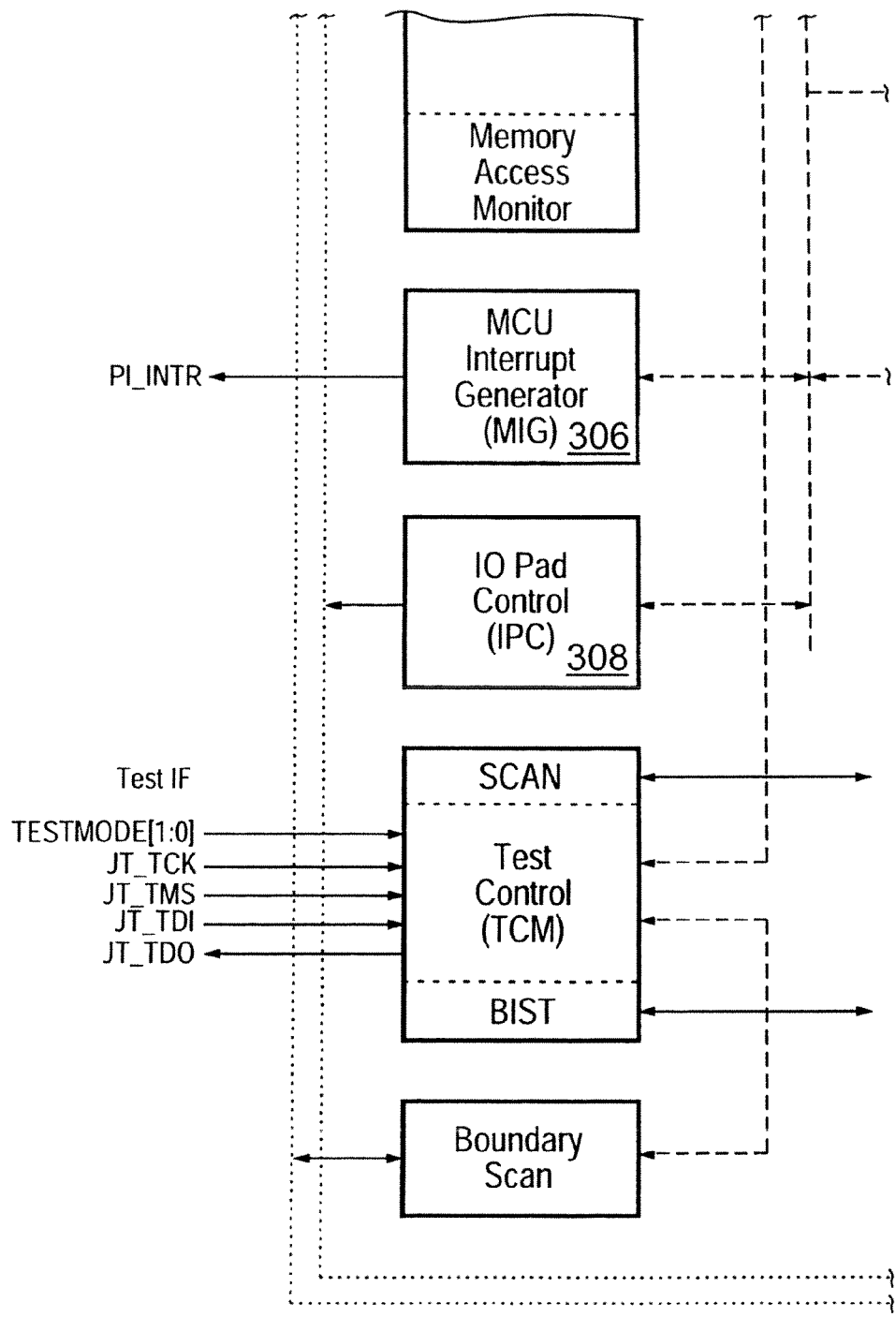
Figure 3F:
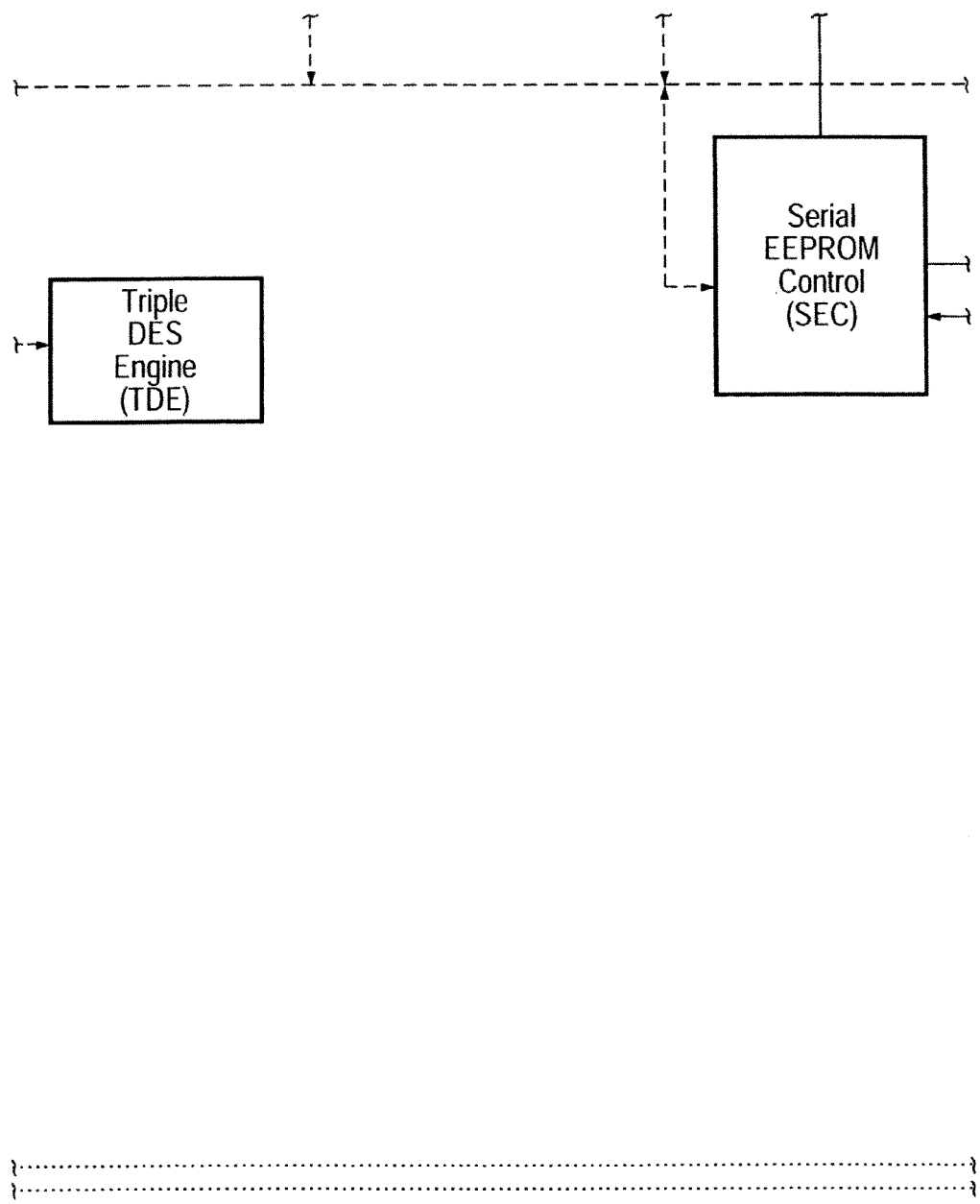
Figure 3G:
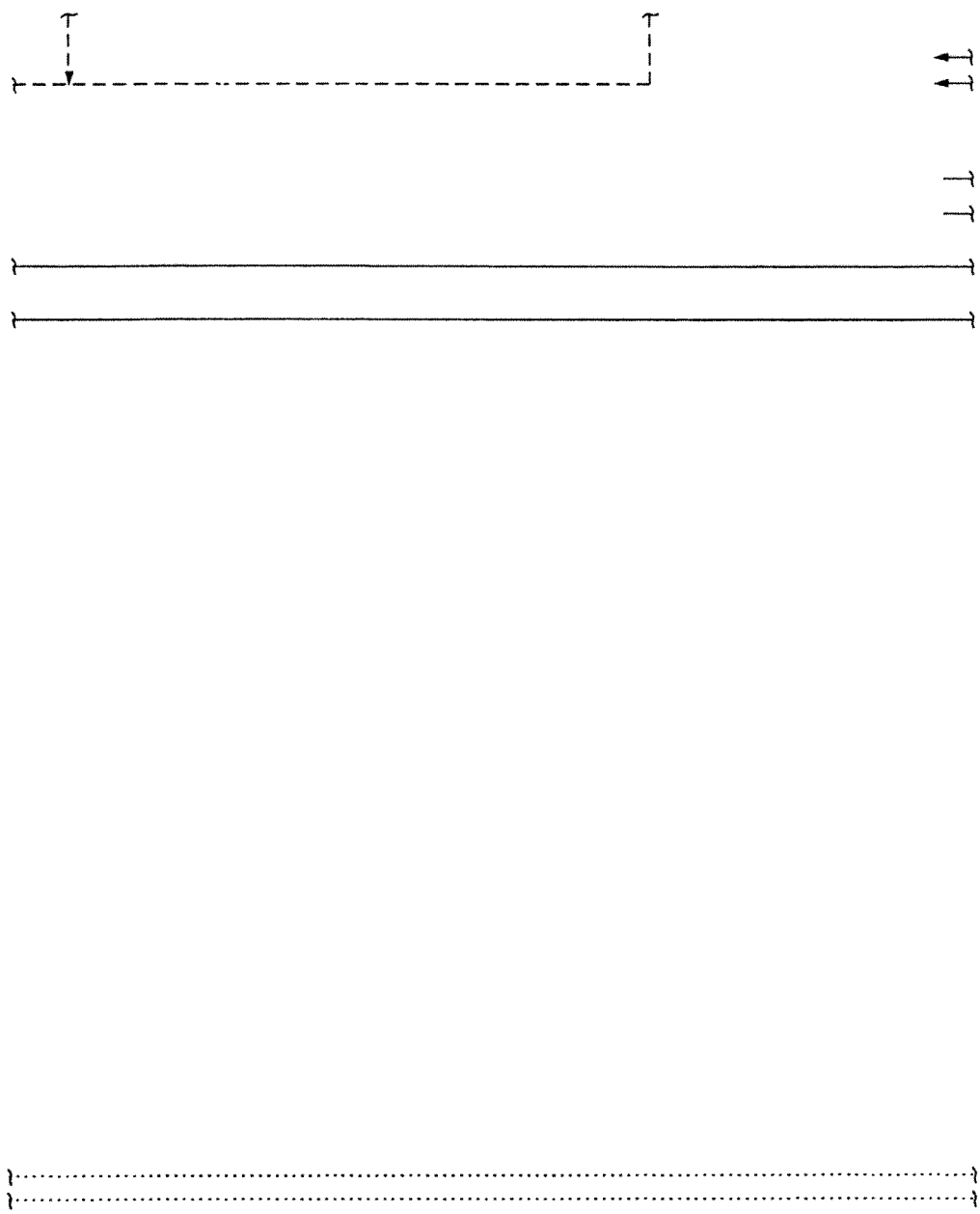
Figure 3H:
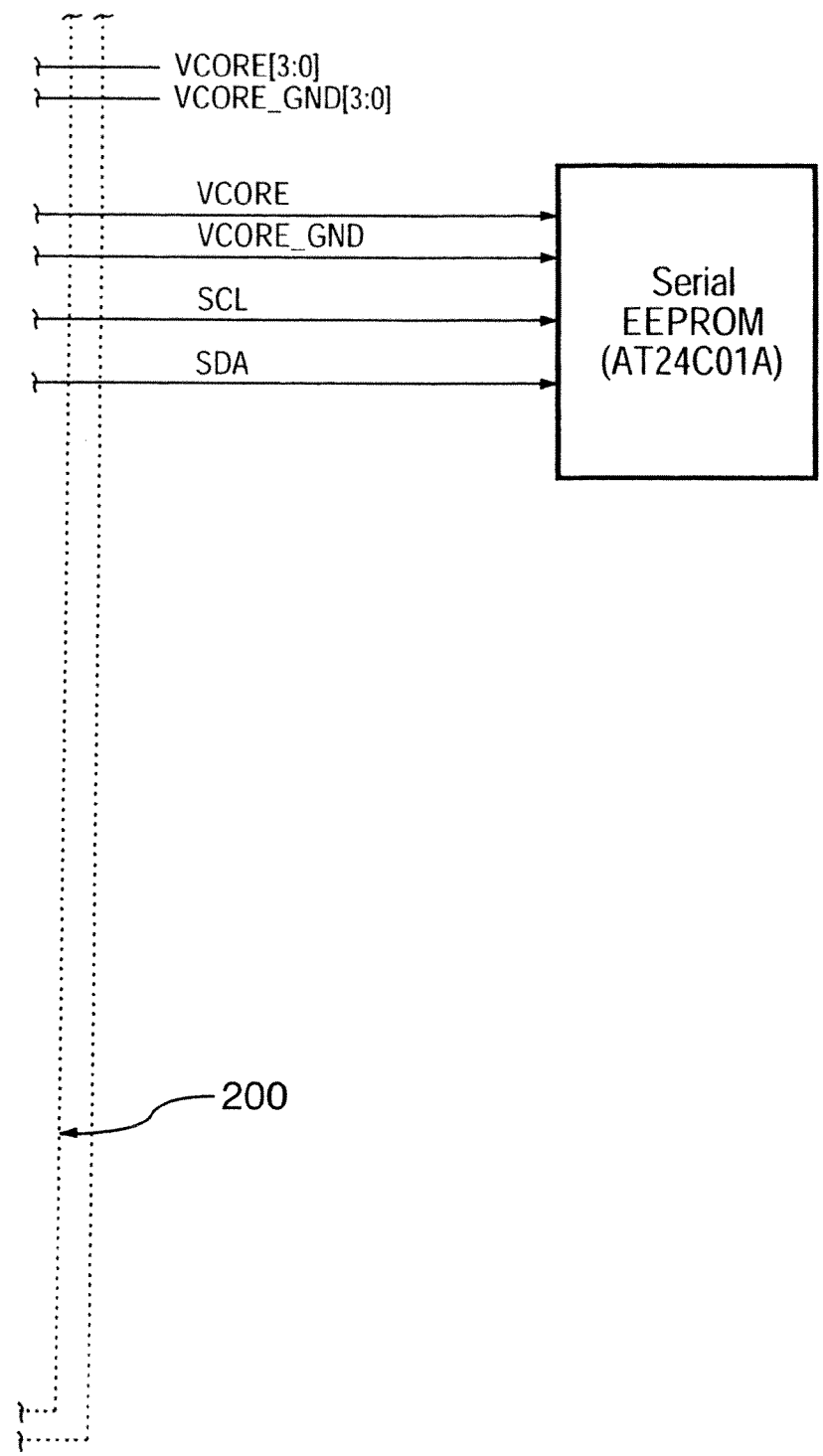
Figure 3I:
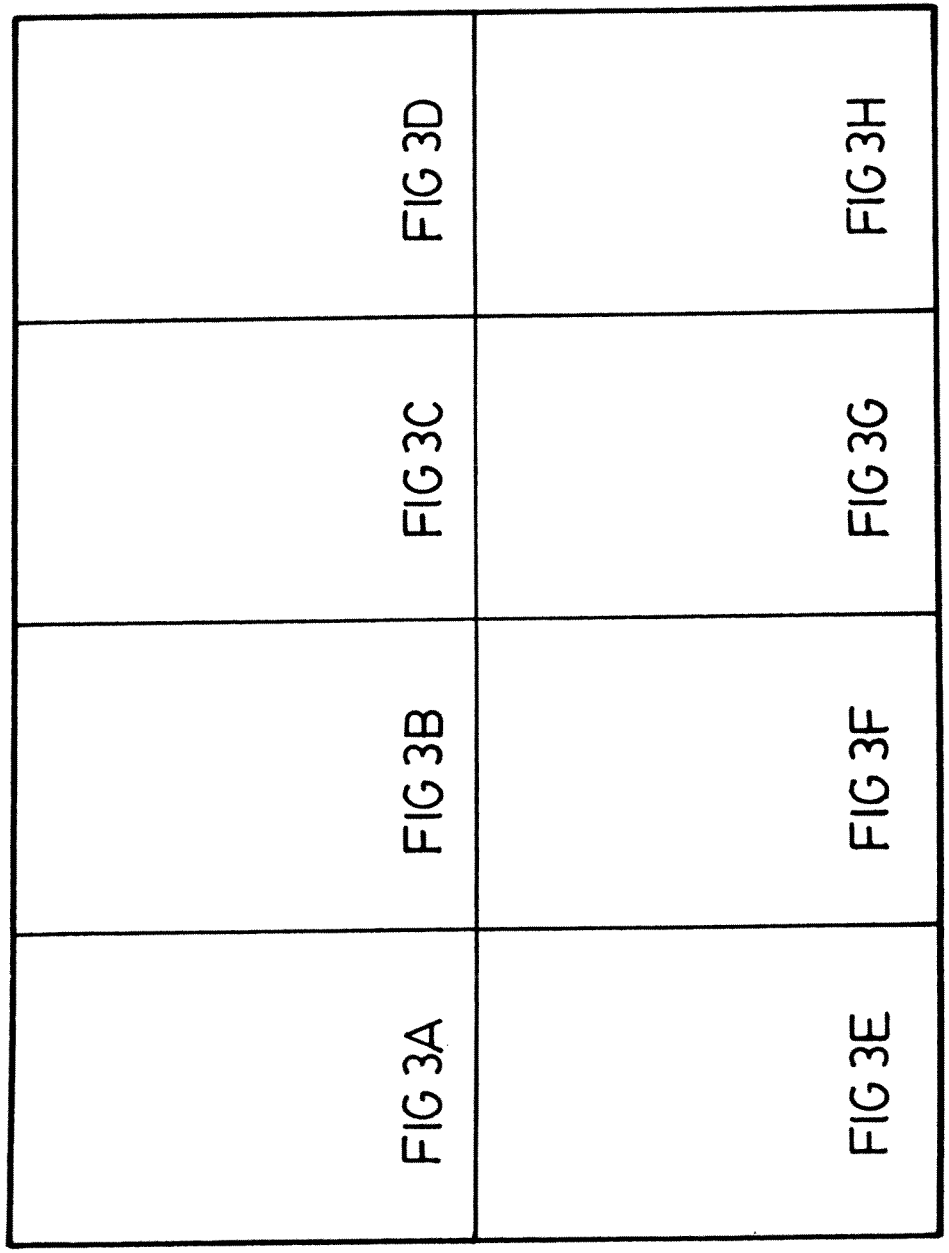

The memory controller interface will be described in detail below, by way of example only, in the context of a hand-held data processing device having wireless communications capabilities as illustrated in FIGS. 1 and 2. However, it will be appreciated that the principles of the system apply to other data processing devices and the system is not intended to be limited thereby.

Referring to FIG. 1, the hand-held mobile communication devices 10 include a housing, an input device such as a keyboard 14 and an output device 16. The output device shown is a display 16, which is preferably a full graphic LCD. Other types of output devices may alternatively be utilized. A processor 18, which is shown schematically in FIG. 1, is contained within the housing and is coupled between the keyboard 14 and the display 16. The processor 18 controls the operation of the display 16, as well as the overall operation of the mobile device 10, in response to actuation of keys on the keyboard 14 by the user.

The housing may be elongated vertically, or may take on other sizes and shapes (including clamshell housing structures). The keyboard 14 may include a mode selection key, or other hardware or software for switching between text entry and telephony entry.

In addition to the processor 18, other parts of the mobile device 10 are shown schematically in FIG. 1. These include a communications subsystem 100; a short-range communications subsystem 102; the keyboard 14 and the display 16, along with other input/output devices 106, 108, 110 and 112; as well as memory devices 116, 118 and various other device subsystems 120. The mobile device 10 is preferably a two-way RF communication device having voice and data communication capabilities. In addition, the mobile device 10 preferably has the capability to communicate with other computer systems via the Internet.

Operating system software executed by the processor 18 is preferably stored in a persistent store, such as a flash memory 116, but may be stored in other types of memory devices, such as a read only memory (ROM) or similar storage element. In addition, system software, specific device applications, or parts thereof, may be temporarily loaded into a volatile store, such as a random access memory (RAM) 118. Communication signals received by the mobile device may also be stored to the RAM 118.

The processor 18, in addition to its operating system functions, enables execution of software applications 130A-130N on the device 10. A predetermined set of applications that control basic device operations, such as data and voice communications 130A and 130B, may be installed on the device 10 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 140. Preferably, the PIM data items are seamlessly integrated, synchronized and updated via the wireless network 140 with the device user's corresponding data items stored or associated with a host computer system.

Communication functions, including data and voice communications, are performed through the communication subsystem 100, and possibly through the short-range communications subsystem 102. The communication subsystem 100 includes a receiver 150, a transmitter 152, and one or more antennas 154 and 156. In addition, the communication subsystem 100 also includes a processing module, such as a digital signal processor (DSP) 158, and local oscillators (LOs) 160. The specific design and implementation of the communication subsystem 100 is dependent upon the communication network in which the mobile device 10 is intended to operate. For example, a mobile device 10 may include a communication subsystem 100 designed to operate with the Mobitex™, Data TAC™ or General Packet Radio Service (GPRS) mobile data communication networks and also designed to operate with any of a variety of voice communication networks, such as AMPS, TDMA, CDMA, PCS, GSM, etc. Other types of data and voice networks, both separate and integrated, may also be utilized with the mobile device 10.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 10 may send and receive communication signals over the communication network 140. Signals received from the communication network 140 by the antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 140 are processed (e.g. modulated and encoded) by the DSP 158 and are then provided to the transmitter 152 for digital to analog conversion, frequency up conversion, filtering, amplification and transmission to the communication network 140 (or networks) via the antenna 156.

In addition to processing communication signals, the DSP 158 provides for control of the receiver 150 and the transmitter 152. For example, gains applied to communication signals in the receiver 150 and transmitter 152 may be adaptively controlled through automatic gain control algorithms implemented in the DSP 158.

In a data communication mode, a received signal, such as a text message or web page download, is processed by the communication subsystem 100 and is input to the processor 18. The received signal is then further processed by the processor 18 for an output to the display 16, or alternatively to some other auxiliary I/O device 106. A device user may also compose data items, such as e-mail messages, using the keyboard 14 and/or some other auxiliary I/O device 106, such as a touchpad, a rocker switch, a thumb-wheel, or some other type of input device. The composed data items may then be transmitted over the communication network 140 via the communication subsystem 100.

In a voice communication mode, overall operation of the device is substantially similar to the data communication mode, except that received signals are output to a speaker 110, and signals for transmission are generated by a microphone 112. Alternative voice or audio I/O subsystems, such as a voice message recording subsystem, may also be implemented on the device 10. In addition, the display 16 may also be utilized in voice communication mode, for example to display the identity of a calling party, the duration of a voice call, or other voice call related information.

The short-range communications subsystem enables communication between the mobile device 10 and other proximate systems or devices, which need not necessarily be similar devices. For example, the short-range communications subsystem may include an infrared device and associated circuits and components, or a Bluetooth™ communication module to provide for communication with similarly-enabled systems and devices.

Referring to FIGS. 2 and 3, the present system provides a memory controller interface 200 that allows a processor 18 designed and configured to operate with NOR flash and SRAM memory devices to instead operate using NAND flash 116 and SDRAM 118. The system accomplishes this by caching sectors out of NAND flash 116 into SDRAM 118, where the data can be randomly accessed by the processor 18 as though it were accessing data from NOR flash/SRAM. Sectors containing data required by the processor 18 are read out of NAND flash 116 and written into SDRAM 118, where the data can be randomly accessed by the processor 18. The processor 18 can use its existing asynchronous or burst memory interface to access the memory controller interface 200, which in turn controls the NAND flash 116 and SDRAM 118. The software running on the processor 18 can access the SDRAM 118 directly or use read/write buffers within an AutoBuffer inside the memory controller interface 200 to transfer sectors of data between NAND flash 116 and SDRAM 118. The data in SDRAM 118 can be randomly accessed just as if using NOR flash and SRAM.

Sectors are tracked as they are written to SDRAM 118. In the preferred embodiment, sectors cached in SDRAM 118 are flagged as either modified or unmodified. Modified sectors are written back to NAND flash 116 when it is convenient for the processor to do so. If SDRAM 118 is full, and the processor 18 requests a sector from NAND flash 116, the memory controller interface 200 erases any unmodified sector in SDRAM 118 and overwrites it with the new data from NAND flash 116. If all sectors in SDRAM 118 have been modified, the memory controller interface 200 reads one or more sectors out of SDRAM 118 and writes it to NAND flash 116 before retrieving the newly requested data from NAND flash 116 and writing it into SDRAM 118.

Also, when the processor 18 issues a data request the memory controller interface 200 first checks SDRAM 118 to determine whether the data sector is already cached in SDRAM 118, and if so reads the data directly from SDRAM 118. Only if the data is not already cached in SDRAM 118 does the memory controller interface 200 execute the read from NAND/write to SDRAM operation. In this fashion only uncached sectors need to be copied to SDRAM 118, reducing the burden on the memory system. Write operations are also cached in SDRAM 118, modifying the sector stored in SDRAM 118 from NAND flash 116, but are not written back to NAND flash 116 until either it is convenient for the processor 18 or all of the sectors stored in SDRAM 118 have been modified and one or more needs to be written to NAND flash 116 before being erased to make room for new data.

In the preferred embodiment a small backup power supply 180 is provided, which is activated immediately by power controller 190 upon detection of power loss from the primary power supply 170. The backup power supply 180 is activated long enough for all modified information stored in SDRAM 118 to be written to NAND flash 116 in an AutoSave procedure. Reset signals to the memory controller interface 200 are handled by a system control module (SCM) 216.

Preferably, an auxiliary interface controller (AIC) 320 is provided to permit the host processor 18 to communicate with an external auxiliary device, while reducing the load on the main processor bus and increasing performance.

While in a conventional system multiple commands are used to read from and write to NAND flash 116, using the memory controller interface 200 only a single read or write command is required for data retrieval or storage in NAND flash 116. The memory controller interface 200 performs a logical and physical mapping of each sector in SDRAM 118 so that the processor 18 can address the memory controller interface 200 as though it were addressing a NOR flash SRAM memory system. The process is thus completely transparent to the processor 18, which reads from and writes to the local memory of the memory controller interface 200 as though the memory were NOR flash with SRAM.

The memory controller interface 200 accordingly allows for the use of NAND flash memory, having a higher data density and being less expensive than NOR flash memory, without necessitating any significant changes to the processor or software architecture. The memory controller interface 200 further handles all memory control and LCD display functions, reducing the burden on the processor with an attendant increase in processing power and speed. A JTAG port may be included to provide test access to the memory controller interface 200. Tests conducted on the memory controller interface 200 may be conducted by a test controller 225.

Figure 8:
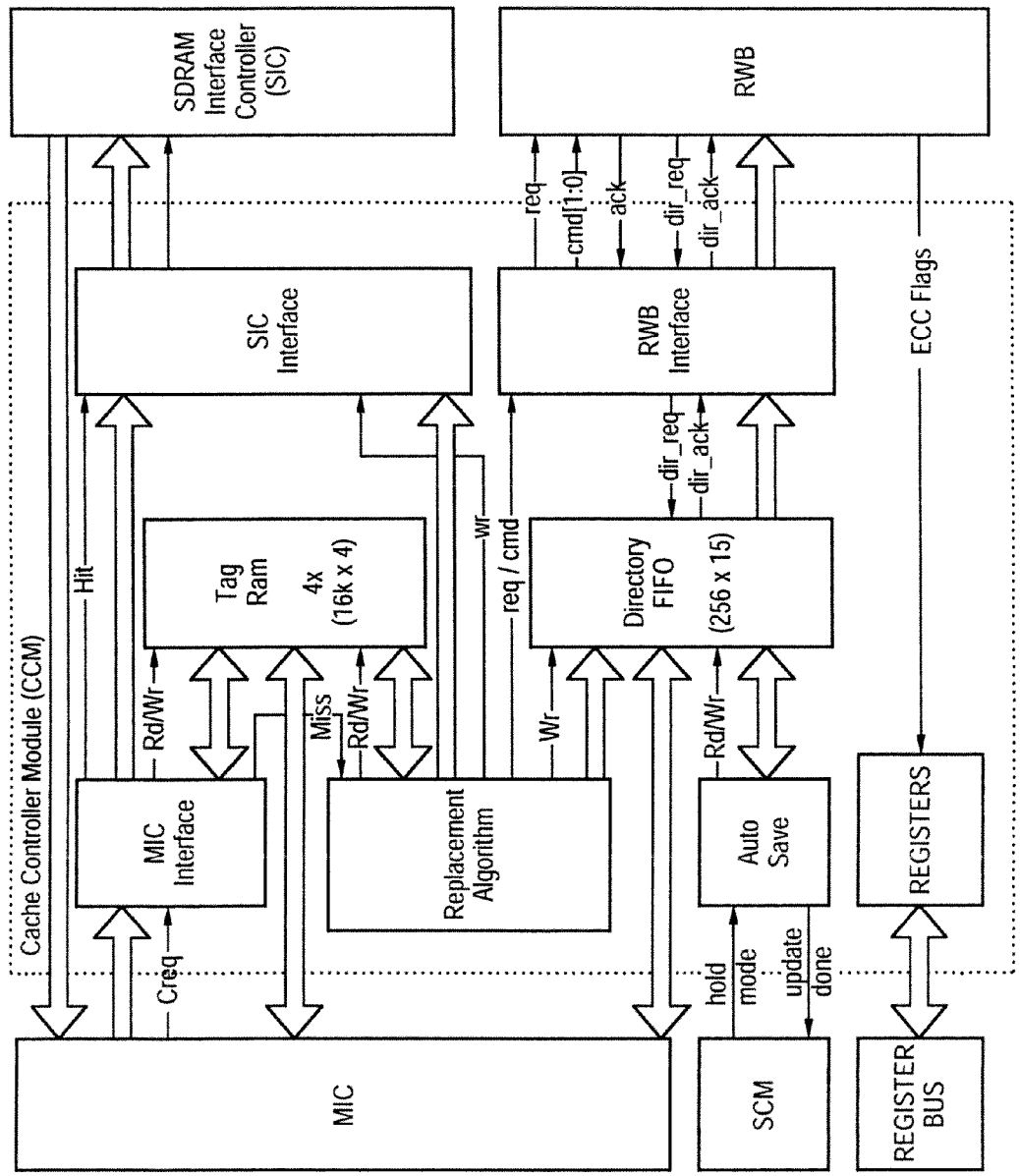
FIG. 8 is a block diagram of a Cache Control Module (CCM) for the memory controller interface of FIG. 3.

The memory controller interface 200 enables the processor 18 to communicate with NAND flash 116 and SDRAM 118 components. In the preferred embodiment, the memory controller interface 200 provides the necessary functions for error control, security, caching, and SDRAM refresh. As shown in FIGS. 2 and 3, the memory controller interface (MIC) 200 comprises a cache controller module (CCM) 210, which manages the flow of data between the NAND flash 116 and the SDRAM 118. A portion of the SDRAM 118 serves as a sector cache for the NAND flash 116. The CCM 210 manages data flow via an AutoBuffer, which in turn is comprised in a read/write buffer (RWB) 212. A block diagram of an embodiment of the CCM 210 is shown in FIG. 8.

The RWB block 212's primary task is to manage the flow of data between the SDRAM 118 and NAND flash memory 116 as directed by the CCM 210. As the block name suggests, there is buffering in the data path, which in the preferred embodiment takes the form of one 4 k×16 and one 256×16 block of SRAM. In addition to data path buffering and flow management, the RWB 212 also performs a hardware automated transfer of boot code from NAND flash memory 116 to SRAM coming out of Power On Reset. During the loading of boot code, the RWB 212 also scans the data for security signatures to set the write and erase permissions of the NAND flash 116 boot sector.

Figure 9:
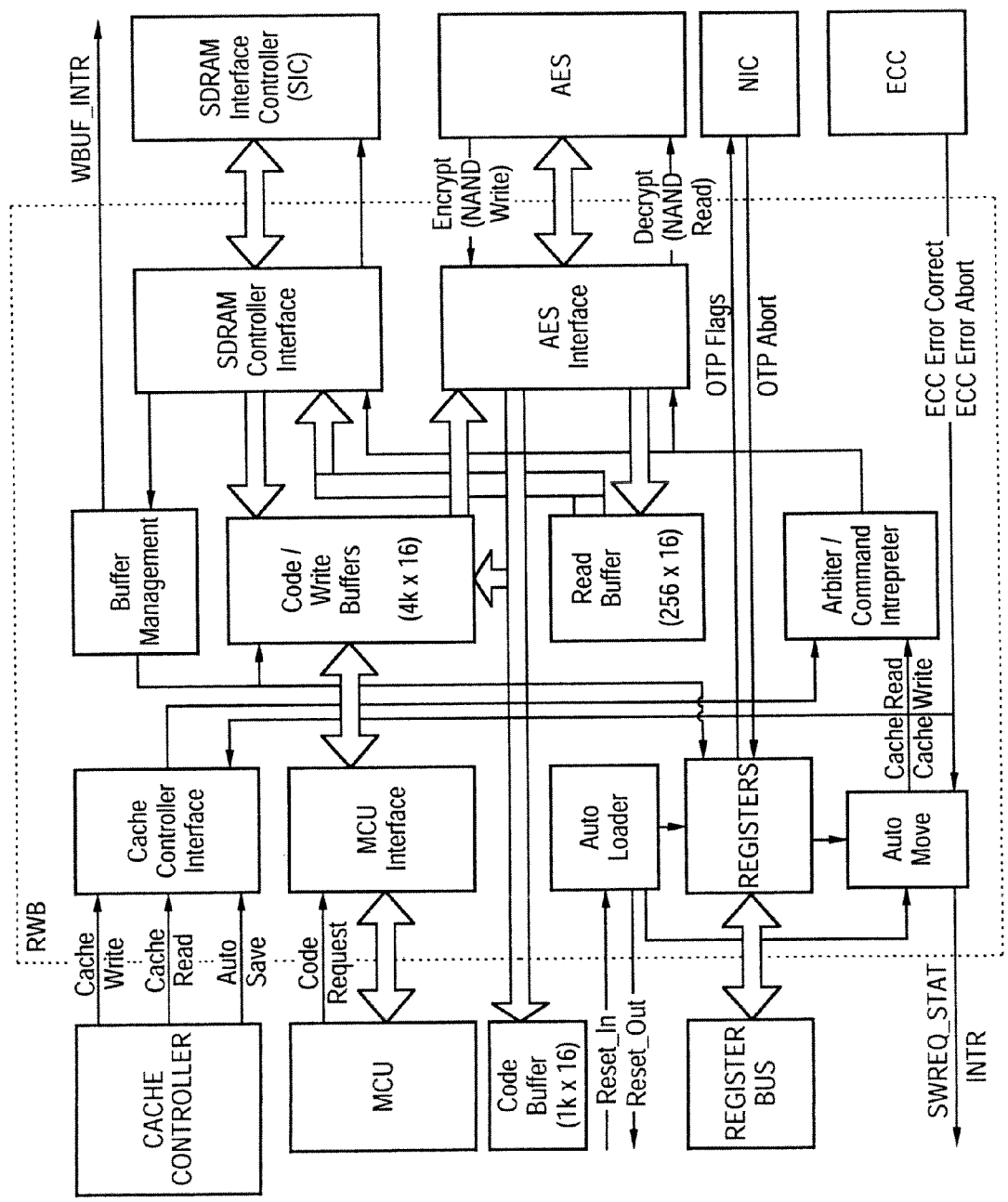
FIG. 9 is a block diagram of the Read Write Buffer (RWB) for the memory controller interface of FIG. 3.

The RWB components and interfaces are shown in FIG. 9. In this embodiment, one 256×16 block of SRAM is used for the read buffer 910 as shown in FIG. 10. One 4 k×16 block of SRAM is used for the write buffers 912 as shown in FIG. 11. All transactions across the RWB 212 are processed on a sector basis through these buffers. The read buffer 910 contains 1 sector of data loaded from NAND flash memory 116 to be written to SDRAM 118. The write buffers 912 contain 8 sectors of data loaded from SDRAM 118 and to be written to NAND flash memory 116. This space contains boot code following an Autoload sequence, and as write buffers 912 are filled, the code is overwritten.

Preferably, a buffer management function allocates the sector resources of the 4 k×16 block of SRAM to the two functional groups: write and code buffers. Within the write buffer group, further management entails marking sectors that become valid as they are filled with data, invalidating the sectors that are drained and become free; and administering an allocation policy of next available sector of highest buffer address.

Figure 4:
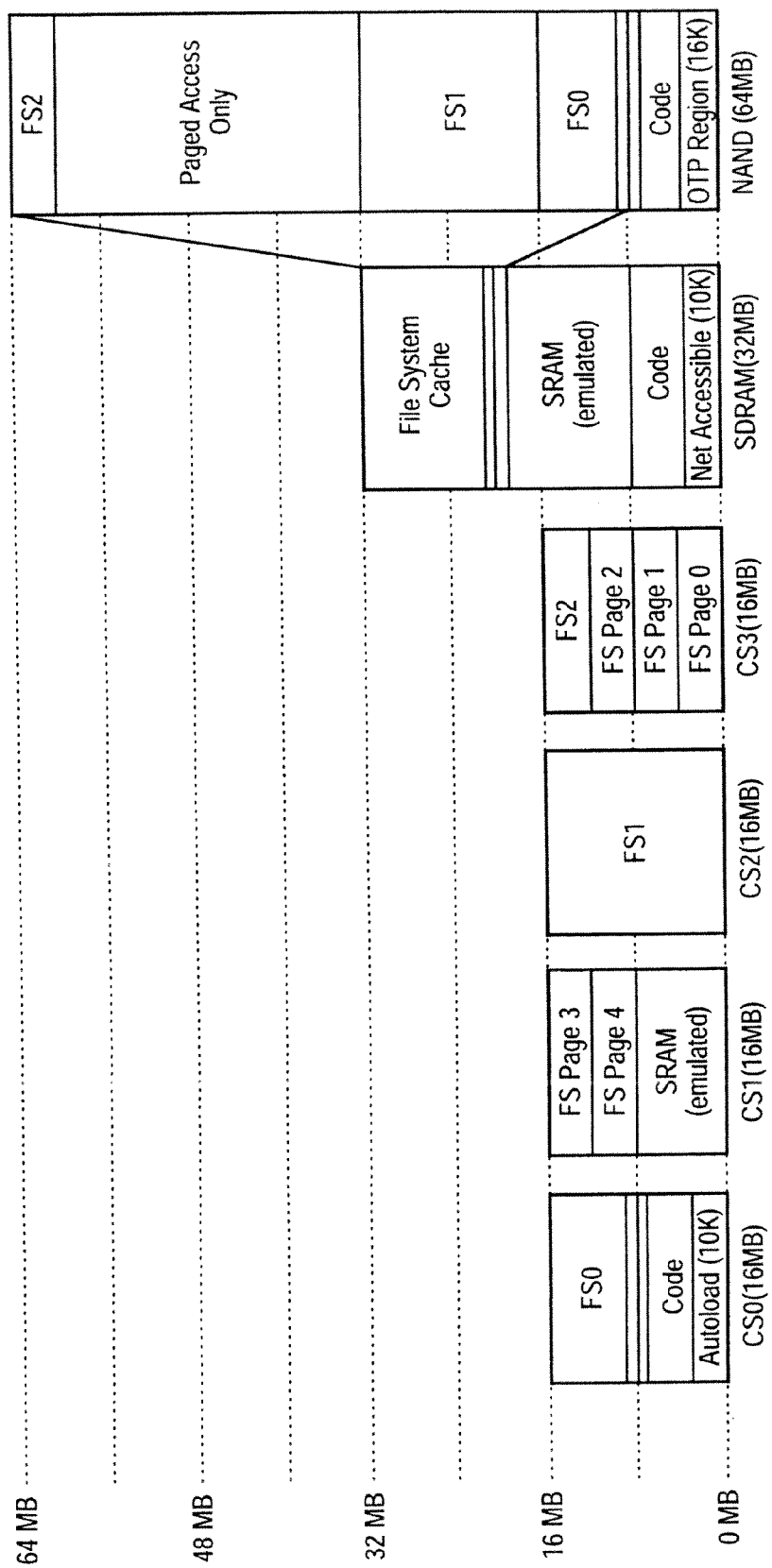
FIG. 4 is a memory map for the memory controller interface of FIG. 3.

In the preferred embodiment, the memory controller interface 200 is able to interface to 16 MB; 32 MB or 64 MB NAND flash chips with either an 8 or 16 bit data bus; and to 8 MB, 16 MB, 32 MB and 64 MB SDRAM chips with a 16-bit data bus. The cache can be configured for up to 8 sets of cache data space, each 1/32 of the file system size. The memory map of an embodiment of 64 MB of NAND Flash 116 and 32 MB of SDRAM 118 is shown in FIG. 4. The partitions of the internal memory controller SRAM and the register spaces are shown in FIG. 5.

The address space of the memory controller interface 200 comprises four regions, program space (CS0 lower part), SRAM (volatile) space (CS1 lower part), register space including internal SRAM and auxiliary addresses (CS1 upper part 64 KB), and file system. The program space and file system are permanently stored in NAND Flash 116 and copied to SDRAM 118 for use. The program space is all copied from NAND Flash 116 to SDRAM 118 during boot-up so that it is immediately available for reading. The file system is cached (copied into SDRAM 118 on demand) in SDRAM 118 one or two sectors at a time.

The cache uses the SDRAM 118 memory space from the top down to cache sectors from the NAND Flash 116. The cache uses up to eight sets (for 128 Mb NAND Flash 116) and seven sets for the larger NAND Flash 116 sizes. Each set is one part in 32 of the total NAND Flash memory size, excluding the program space for up to 512 KB, 1 MB and 2 MB for 128 Mb, 256 Mb and 512 Mb NAND sizes respectively. The remaining SDRAM space (not program or cache) is used for SRAM (volatile storage). To increase the size of SRAM, the number of sets in the cache can be reduced at the cost of a higher miss ratio.

Through the address space at the top of CS1, software is able to directly access the internal SRAM blocks of the functional modules listed below:

Cache Tag SRAM (32 KB), which preferably comprises 64K tag entries of 4 bits (or 32K entries of 8 bits if 128 Mb NAND Flash is used), one tag entry for each sector in NAND Flash 116 (or one entry for a group of 2 sectors for 512 Mb Flash 116), and which may be read to determine which modified sectors need to be written back to NAND 116;

Read Buffer (0.5 KB), which may be read to debug sector data movements; and

Write Buffers (8 KB), which may be read to debug sector data movements.

The tag SRAM used by the cache is 4 blocks of 16K words of 4 bits. For use with the smallest (128 Mb) NAND Flash 116, the tag SRAM is configured as 32K words of 8 bits with a modified sector bit, a sector valid bit and 3 set number bits (3 bits are unused). With 3 set number bits, 8 sets can be used by the cache (a set is a sector location in SDRAM 118 where 1 out of 32 NAND Flash sectors can be stored for immediate read or write access). For all other NAND Flash sizes, the tag SRAM is configured as 64K words of 4 bits with a modified sector bit and 3 set number bits. Because there is no sector valid bit, the 0 set number is used to indicate that the sector is not valid, leaving 7 sets useable. If the cache is enabled, the modified sector bit is cleared when a sector is loaded in the cache and set when a location in the sector is written for the first time. If the cache is disabled and a modify bit enable is set, the modified sector bit is set when a location in the sector is written for the first time and cleared by software directly writing the tag SRAM entry.

In this embodiment, the tag SRAM is automatically cleared on the exit of reset. It can also be cleared by writing the tag SRAM Clear bit to '1'. Upon completion of the clear operation, the tag SRAM Clear bit will read back '0'. Optionally, software can write zero to all locations of the tag SRAM. The tag SRAM reads and writes as 16K locations of 16 bits with bits 3:0 being offset 0 and bits 15:12 being offset 3 for 64K words of 4 bits, and bits 7:0 being offset 0 and bits 15:8 being offset 1 for 32K words of 8 bits. For all NAND Flash 116 sizes except the largest (512 Mb), each tag entry represents 1 sector of 512 bytes. The 512 Mb NAND Flash 116 requires that each tag entry represent 2 sectors (1 KB) since the NAND Flash 116 has 128K sectors and the tag SRAM has only 64K entries.

Thus, for cache tracking of modified sectors, the tag SRAM is a 64K by 4 bit SRAM containing a 3 bit set number and a modified bit for each sector in NAND Flash file system (each tag entry represents 2 sectors (1 KB) for 512 Mb (64 MB) NAND Flash or 1 sector for smaller NAND flash devices). The modified bit is set whenever the processor interface 200 writes to the sector and the modified bit was previously clear. At the same time a counter tracking the number of modified sectors is incremented. The modified bit is cleared when a sector is transferred from SDRAM to a write buffer in the AutoBuffer and the counter tracking the number of modified sectors is decremented. The software will get an interrupt when the number of modified sectors exceeds a programmable limit and must scan the tag entries to determine which sectors should be written to NAND Flash (a write to NAND Flash is in an erased block).

When the host processor 18 performs a cached file system access request, the memory controller interface 200 will check the cache and if the data is in the SDRAM 118, complete the transaction. On a cache miss, the cache searches the 32 tag entries corresponding to the sector requested for a blank or nonmodified entry; if all are modified sectors, the cache requests the AutoBuffer to move the sector from SDRAM 118 to a write buffer and then requests the AutoBuffer to read the NAND Flash 116 sector and move it to SDRAM 118. The cache can be configured to release the bus on a cache miss, or hold it as long as necessary to retrieve data. If the cache is to release the bus, then dummy data is provided, and software must perform the access again once the cache has been filled. If the cache is permitted to hold the bus, then the cache stalls the processor interface for as long as it takes to bring in the sector from memory and complete the transaction. This could take as long as 50 us.

In release mode, the cache has several registers and counters that can be use to reconstruct the instruction that must be re-executed. The write buffers in the AutoBuffer are monitored and an interrupt is generated when the number of occupied buffers reaches a programmable limit. Software must respond to this interrupt by moving the write buffers into NAND 116.

Because NAND Flash 116 sectors are subject to errors, in a preferred embodiment Error Correction Coding (ECC) is generated for sectors written to NAND Flash 116 and checked on sectors read from NAND Flash 116. Preferably, the ECC block 324 is able to detect 2 errors in each ¼ of a sector and correct 1 error in each ¼ of a sector. The ECC check bits are stored in the spare area of NAND Flash 116, 3 bytes per ¼ sector (12 out of 16 spare bytes used, 2 spare bytes may be used by the NAND Flash manufacturer to mark bad blocks). The ECC is generated on the fly as the data is transferred to the NAND Flash 116 for a write operation. The ECC is checked on the fly as the data is transferred from the NAND Flash 116 on a read but also stored in a read buffer in the ECC module 324 in case of an error. Upon detecting an error, the ECC will determine the bit that is in error and correct it in the read buffer 910. Since the data read from the Flash 116 was already decrypted, as set out below, and stored in a read buffer 910 in the AutoBuffer, the corrected data must be transferred again, the ECC 324 will signal the AutoBuffer to re-transfer the sector.

The check bits are generated during the process of programming a sector, and are written along with the data in the spare bytes of the NAND flash 116 sector. During data read out, check bits are generated as the sector is read. Once the complete sector has been read the check bits are compared with the stored parity bits, and correctable errors are corrected. All sectors read in, including the boot sectors, will contain check bits that need to be verified.

To provide some ability to trap runaway software, preferably memory regions are defined using start and stop address register pairs. Memory accesses outside of these regions will latch the memory address and will attempt to notify the processor through an external interrupt signal. In addition, even if interrupts are disabled, the processor 18 may be notified of code execution that has exceeded the memory boundaries defined by the start and stop address pairs by replacing the data that is read with predefined data in an internal register with a value which if executed will cause a software interrupt (SWI) or an undefined instruction trap. The processor internal states and Fetch vs. Read information are not available to the memory controller interface 200.

In the present embodiment, software commands or cache requests (such as miss or AutoSave) cause the AutoBuffer to transfer a sector from SDRAM 118 to a SRAM write buffer 912. Software commands or cache requests (such as miss) cause the AutoBuffer to transfer a sector from a SRAM read buffer 912 to SDRAM 118. In both cases the software (through AutoBuffer registers) or the cache controller 210 supply the address of the sector in SDRAM 118.

The AutoBuffer manages the write buffers 912 and selects an empty write buffer for the transfer. The memory controller interface 200 will transfer data from the NAND Flash 116 to the SDRAM 118 during the following conditions:

whenever the host processor 18 requests data that is not currently in the SDRAM cache 118; or in response to software commands by the host processor 18; or during a Boot Load sequence.

To retrieve the data, the memory controller interface 200 will read the sector, including the check bits, of the NAND Flash 116 containing the requested data. It will check the error correction coding, and correct the data if necessary. For cached file system data, the sector of data is then placed into an unused sector in SDRAM 118, and the host read operation completed. For program data, the sector of data is placed in the specified SDRAM 118 sector. A check is made for invalid blocks by software, and all invalid blocks are skipped on erasing, writing programming data, and reads. Read operations from NAND Flash 116 are performed on a sector basis. The processor interface Wait signal is used to hold off processor 18 execution, or depending upon the access mode, dummy data is returned, and an interrupt is generated to force software to restart the load instruction.

The memory controller interface 200 will transfer data from the SDRAM 118 to the NAND Flash 116 during the following conditions:
 as directly requested by the host processor 18; or
 when the cache is filled and the sector needs to be replaced and has been modified; or
 during an AutoSave sequence.

To transfer the data, the memory controller interface 200 will read the sector from SDRAM 118, encrypt and generate the ECC check bits. The data, along with the check bits are programmed into the NAND Flash 116 in a newly erased sector. On all NAND Flash 116 devices, erase operations are performed on a Block basis; program operations to NAND Flash 116 are performed on a sector basis.

Figure 13:
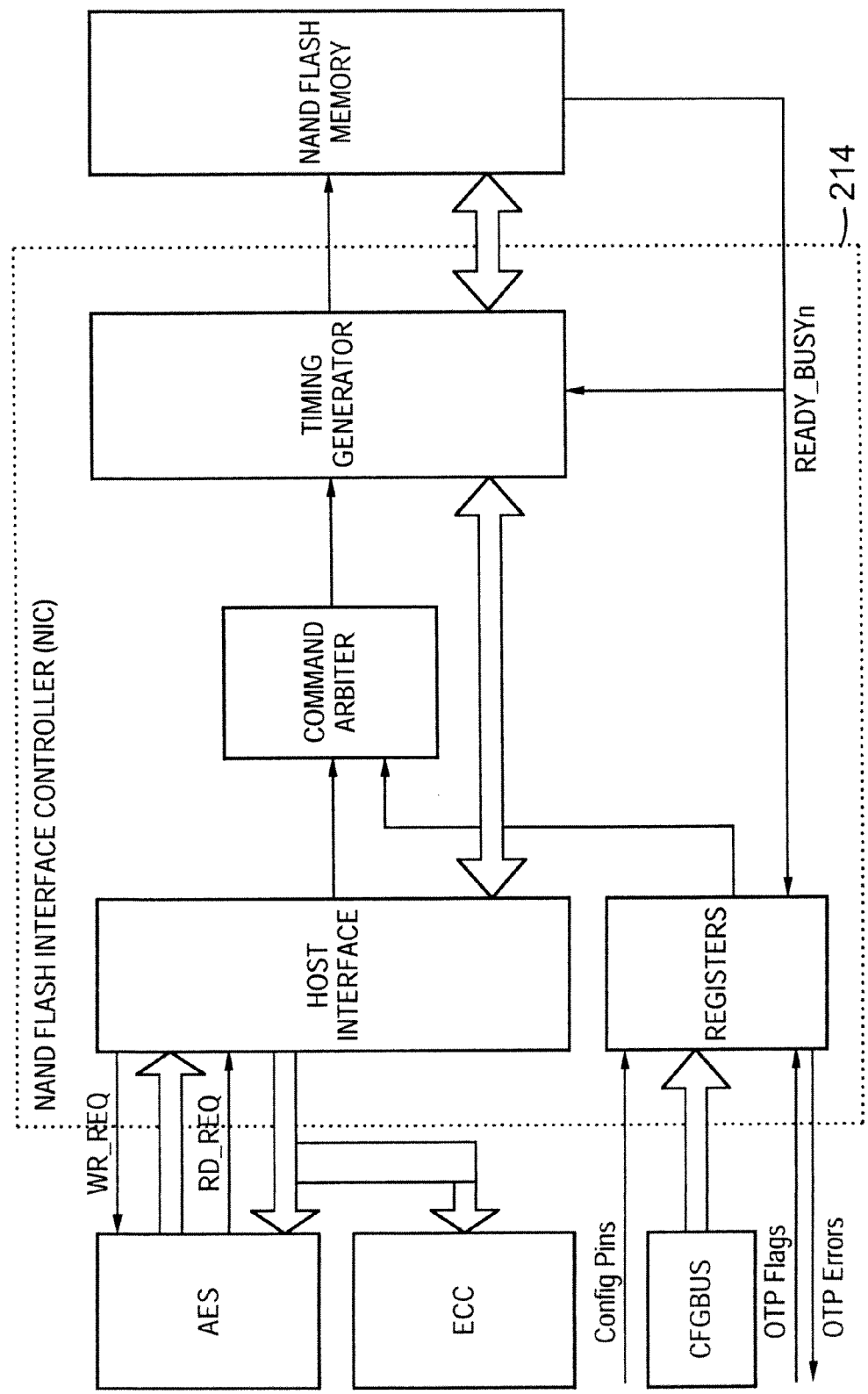
FIG. 13 is a block diagram of the NAND flash Interface Controller (NIC) for the memory controller interface of FIG. 3.

AutoLoad requests after Reset, software commands or cache requests (miss) cause the AutoBuffer to transfer a sector or sectors from NAND Flash 116 to SRAM (read buffer 912 unless AutoLoad which loads all of SRAM). Transfers from NAND Flash 116 are checked (corrected) by the ECC module 324 and decrypted by an AES block 316 (except program code). The cache supplies sector address on reading Flash 116, except for AutoLoad which is hard coded from 0. AutoSave requests (from the cache controller 210) or software commands to NAND Flash 116 cause the AutoBuffer to transfer a sector from a SRAM write buffer 912 to the NAND Flash 116. Transfers to NAND Flash 116 are preferably encrypted by AES and have ECC generated. A NAND Flash controller 214, shown in FIG. 13, supplies the sector address except for AutoSave, which uses erased block pointers in either the AutoBuffer or the cache 118.

In the preferred embodiment, all NAND Flash operations (such as Read Id, Read, Write, Erase) except AutoLoad and AutoSave are controlled by software commands to the NAND Flash controller 214. AutoLoad automatically reads sectors from Flash Block 0 to fill the Boot code SRAM(s) and check for One Time Programmable (OTP) signatures. AutoSave uses a shadow pair of command registers in the NAND Flash controller 214 which are pre-written with the commands to write to NAND Flash 116. Erasing block is performed under software control. All writing of data to the NAND Flash 116 is under software control, except for the sectors saved during the AutoSave process.

Reading of NAND Flash 116 sectors is done automatically during the AutoBuffer sequence and during a cache miss. Additionally, reading NAND Flash 116 sectors is done under software control to read in the Program Code, and during non-cached reads. In this case, software executes the read command to read a sector into the read buffer of the Read Write Buffer (RWB) 212. The sectors will have been processed by the error correction coding (ECC). If the read is from the File System area of NAND Flash 116, then an AES encryption module 316 will also decrypt the sector.

The SDRAM controller 314 automatically does Auto Refresh either hidden when the processor FIFO can supply a sequential read access for fixed wait state (no nWAIT) interfaces, or when the processor interface is idle. The SDRAM controller 314 must perform either 4096 or 8192 Auto Refresh cycles every 64 milliseconds, and enters Self Refresh on a software command indicating that the system is going into suspend (shutting down the 13 MHz clock) and exits either by a software command or automatically on the first access (exit requires some time so automatic exit is not possible in fixed wait states mode). Because the SDRAM can not be accessed in Self Refresh, preferably this portion of code must be executed from the processor 18's internal SRAM or the dedicated Suspend code SRAM in the memory controller interface 210. Self Refresh keeps the SDRAM data while consuming the least energy. The SDRAM refresh controller provides refresh control for the connected SDRAM device. Refresh operations will be interleaved with normal memory accesses and performed during periods of inactivity to reduce performance degradation.

The memory interface controller 200 provides the capability to program pages of NAND Flash memory 116 using encryption. The MIC 200 provides access to the configuration registers (CR) and the internal SRAM blocks. Referring again to FIG. 4, the SRAM on CS0 is used to boot, the cache tag SRAM is used for modified sector management, and access to the other SRAMs is for debugging purposes. The default state will be to have the CRs and SRAMs located in the top 64 KB of CS0. Preferably, changing a register setting will move the SRAM and CRs to the top of one of the four chip selects. The advantage of being able to move the SRAM and CRs to different chips selects is to make operation with the host's 18 internal cache easier. Since some registers contain status bits that get updated, having the cache enabled will not work. Therefore to accurately read this type of register, the cache must be disabled. In the case of some processors, to disable caching to CS1$n$, the entire cache data has to be disabled; and since it will be possible to write to an area that may be in cache, when the cache is turned back on, the entire contents of cache will have to be erased/invalidated as there is no guarantee that they match main memory. If the SRAM and CRs are moved to CS2$n$ or CS3$n$, the cache can be temporarily disabled on just the one chip select and the cache will keep track of any areas that were written to, and invalidate them in its cache, allowing the cache to re-enable without data discrepancies. If an alternate address to CS3 is employed, only three chip selects can be used, CS0, CS1 and CS2. Therefore, in the preferred embodiment the CR/SRAM space must be located in the top 64 KB of one of these regions. For example, CS0, CS2 combined can access up to 64 MB of NAND Flash 116, and CS1 could access the SRAM emulation portion of the SDRAM 118.

The MIC 200 will request data from the CCM 210 when it receives an access from the host processor 18 that targets regions covered by the CCM 210. If cache is disabled the MIC 200 does not make any requests to the CCM 210. Preferably, accesses to the following areas will cause the MIC 200 to target the CCM 210 for data:
 on CS0: the CCM 210 covers the region above a value preferably set by program code space configuration parameters, to the top of the address space on CS0;
 on CS1: the CCM 210 covers the code file system space on this chip select; the rest of the chip select can be used to emulate SRAM;
 CS2 and CS3 (if enabled) are covered by the CCM;
 the CR/SRAM space will be located on one of the chip selects, depending on program code space configuration parameters. Therefore the top 64K of one of the chip selects will not be accessible in terms of using it for NAND caching or SRAM emulation. If an alternate address to CS3 is used, the CR/SRAM space will still be located at the top (floats to the top).

In the preferred embodiment, part of the address space that the host processor 18 sees will be paged, so that larger NAND devices can be used. As shown in FIG. 7, there are five 4 MB pages available, each corresponding to a chip select. The five page configuration registers configure these pages, and can target any area of NAND flash 116. Therefore it is possible to have two pages targeting the same addresses in NAND 116, or one page targeting code space, which is already visible. The first three pages are located at 0 MB, 4 MB, and 8 MB of CS3. The top 4 MB of CS3 is a fixed page targeting the top of NAND flash 116. Therefore, it is recommended that the CR/SRAM space is located here and that autosave points to this area, so that effectively there is no unusable hole in the NAND space, since it does not see the CR/SRAM space. If CS3 is disabled and an alternate address is used, the pages disappear with CS3, as they are not needed given that between CS0 and CS2 the full 64 MB of NAND 116 can be addressed. The other two pages are located at 8 MB and 12 MB of CS1. Depending on what the value of SRAM_SPACE space is set to, both, one, or none of these pages will be accessible.

Figure 15:
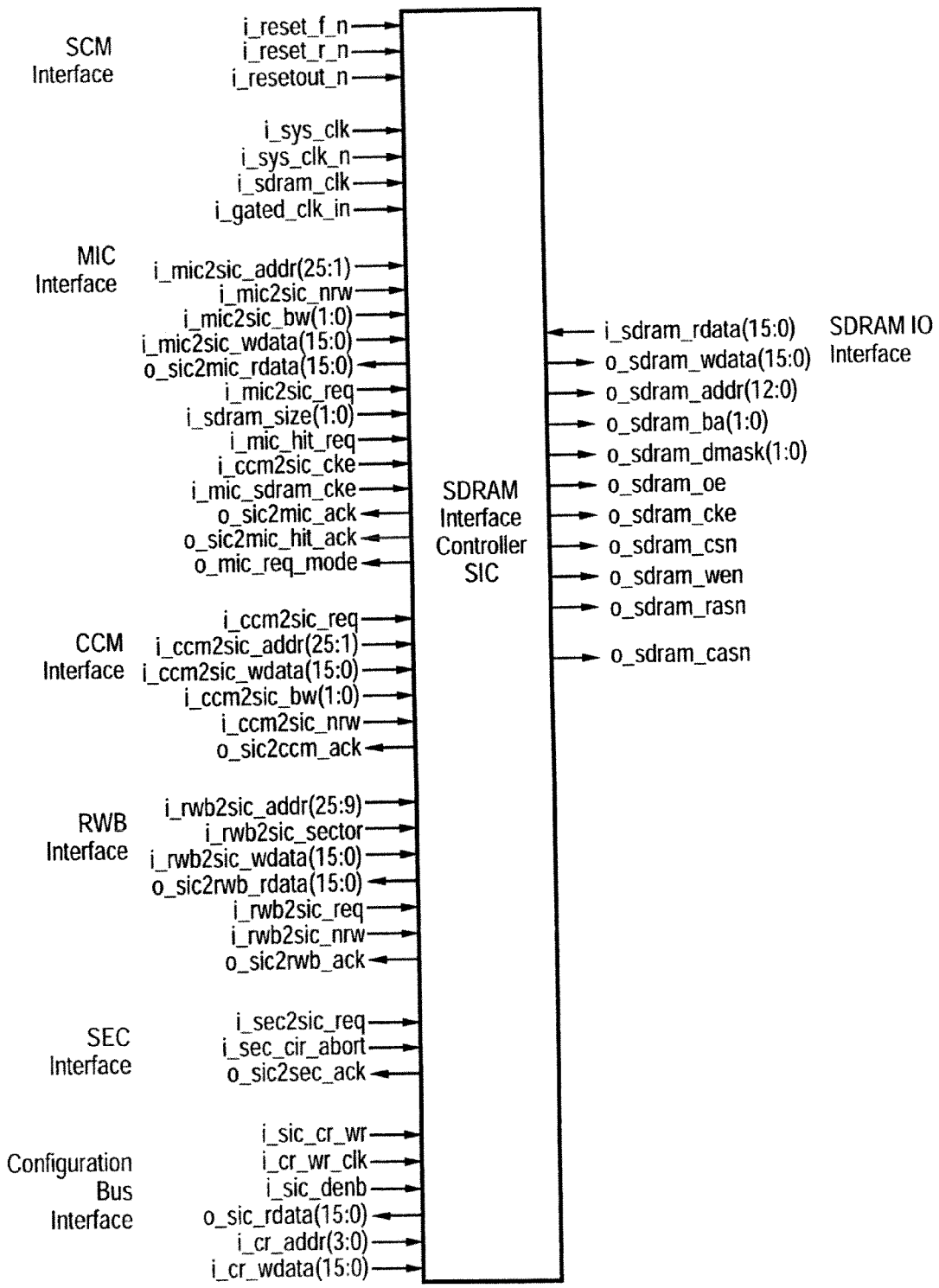
FIG. 15 is a block diagram of a SDRAM Interface Controller (SIC) for the memory controller interface of FIG. 3.

In the preferred embodiment, a SDRAM interface (SIC) 314, shown in FIG. 15, controls the flow of data between an external SDRAM chip and an external processor chip through the processor interface control, and between the SDRAM 118 and the NAND Flash 116 through the RWB 212. For file system accesses, the CCM 210 modifies the address from the processor 18 interface and sends the new address to the SDRAM 118 interface.

Preferably, the MIC's 200 interface to the SIC 314 generates the SDRAM clock and the SDRAM clock enable signals. The SIC 314 will receive a request from the MIC 200 if the host processor 18 is accessing code space or emulated SRAM when cache is enabled, or always when the cache is disabled. When cache is enabled the following areas are covered directly by the SIC 314:
  on CS0: the SIC 314 covers the region used for code starting above the 10 KB boot SRAM area until the end of the code area preferably defined by program code space configuration parameters;
  on CS1: the SIC 314 covers the area that is being used to emulate SRAM. Preferably, this is the only area that is byte writeable using the UBn and LBn control signals as shown in FIG. 3. The size of this area is determined by program code space configuration parameters and can be defined as 8M, 12M or 16M. If it is set up to use the full 16M, the top 64 KB will be notched out for CR/SRAM space. Note that not all of the SRAM space is available when the cache is enabled. The SRAM occupies the remaining SDRAM between the top of code space and the bottom of cache space.

In the preferred embodiment, an AutoSave function has four pointers to erased blocks that will be written on power fail. Each of the AutoSave address registers point to a single erased NAND Flash 116 block or a group of two consecutive erased NAND Flash blocks depending upon the configuration of the memory interface controller 200.

An access from the processor interface to the file system causes the corresponding tag entry to be read if the cache is enabled. The tag SRAM has 64K entries of 4 bits (32K entries of 8 bits for 128 Mb Flash), one for each sector (or group of 2 sectors for 512 Mb Flash) in NAND Flash. Upon reading the tag entry, the sector that is accessed is checked to see if valid data is in the cache. If the sector has valid data, the cache calculates the SDRAM address of the start of that sector and appends the offset of the current access to form the address for the SDRAM to read or write the requested location. For the tag organization of 32K entries of 8 bits, bit 3 is the valid bit and if set indicates a cache hit, bit 4 is the modified bit and bits 2:0 are a set number with values of 0 to 7. With the 64K entries of 4 bits, bits 2:0 are a set number with values 1 to 7 indicating a cache hit, bit 3 is the modified bit. The calculation of the sector start address in SDRAM is performed using predetermined configuration settings and access address.

Similarly when the tag is read (cache enabled) on a processor access and the valid bit is '0' for 128 Mb Flash or the set number is "000" for 256 Mb or 512 Mb Flash, the sector data is not in cache, this is a cache miss and causes either a Cache Read Miss interrupt or a Cache Write Miss interrupt. For a read, the data returned is incorrect and requires corrective software action in response to the interrupt in order for software to re-execute (emulate) certain instructions, the processor address of the failed read is latched in a register. For a write, the write data is latched and will be written to SDRAM 118 once the new sector has been written to SDRAM 118.

On a cache write miss, the interrupt is used only to mark time until the sector is replaced. Since the file system cache is emulating the old NOR Flash, writes are single words (16 bits) only. Thus store multiple instructions will not occur to the cache address space. On a cache miss, a request is made to the AutoBuffer to read the data from NAND Flash 116 to the internal read buffer (512 byte buffer in AutoBuffer) and then to write this data to the cache after selecting the set number of where the data will be stored. For the 512 Mb NAND Flash 116, each tag entry refers to two consecutive sectors so that the CCM 210 needs to perform two requests to the AutoBuffer (1 for each sector). Since the cache miss may be caused by a load multiple instruction or a processor cache line fill which requires up to 32 accesses to complete, all cache miss cycles after the first will be ignored until a cache hit or non-cache access is encountered. Another cache miss after this but while the request to the AutoBuffer is active will cause a Double Sector Fault Interrupt to occur.

To determine how many bad data items have been given to the processor on a load multiple instruction that crossed a sector boundary, a consecutive Cache Miss count is available. To choose a set number involves the following Replacement Algorithm operations:
  1) Check if the sector entry is located in the RWB write buffer 912.
  2) If not, read the 32 tag entries that correspond to the current offset in NAND Flash 116 and check if any of the set numbers (0-7 for 128 Mb Flash or 1-7 otherwise) are unused.
  3) If a set number is free, place that set number in the current tag entry and write the sector to the corresponding SDRAM 118 location, else continue with 3).
  4) Read the 32 tag entries that correspond to the current offset in NAND Flash 116 and check if any of the entries has a modified bit that is clear.
  5) If a clear modified bit is found, invalidate this tag entry and place this set number in the current tag entry and write the sector to the corresponding SDRAM location, else continue with 5).
  6) Pick one of the tag entries with a modified bit set, request the AutoBuffer to move the sector (2 sector requests if 512 Mb NAND Flash) that this tag entry represents to a write buffer(s) 912 in the AutoBuffer, invalidate this entry and place this set number in the current tag entry and write the sector via the AutoBuffer to the corresponding SDRAM 118 location.

In order to pick a modified sector to replace in step 5), the 32 tag entries that correspond to the current offset in NAND Flash 116 are read and the entry chosen that matches the set number counter. This is a 3 bit counter that is incremented after each use and provides a means to randomly choose the sector to replace. Although the above steps are listed sequentially for ease of understanding, the 32 tag entries are read only once and checks for unused set number, clear modified bit and set number match with the set number counter are all performed in parallel. The 32 tag entries checked are all possible NAND Flash 116 sectors that can occupy this sector in each of the cache sets (a set has ⅟₃₂ of the total number of NAND Flash 116 sectors in the top region of SDRAM). Once the sector has been replaced, a second interrupt is generated, a Cache Replace Complete interrupt which signals to the software that the write is done and the read may be retried.

The Modified Sector counter keeps a running tally on the number of cached file system sectors that have been modified so that the number does not exceed the ability of AutoSave to write to NAND Flash 116 on a power fail. The Modified Sector counter is incremented on a write to a cached sector that has the tag SRAM modified bit updated from '0' to '1' (indicating a first write since the sector was loaded into SDRAM). The Modified Sector counter is decremented when a cached sector is transferred to a write buffer 912 in the AutoBuffer. Software is given a Modified Sector interrupt when the Modified Sector counter exceeds the Modified Sector Limit register. The interrupt is cleared when the Modified Sector counter is reduced to less than the Limit register by sending sectors to the AutoBuffer for writing to NAND Flash 116. When the tag Modified Sector bit is read clear on a write to a cache sector, the tag entry must be written back with the Modified Sector bit set as the Modified Sector counter is incremented.

A 256×16 block of SRAM is used to queue up the sector addresses of file system cached sectors that have been modified. The entire block of memory is memory mapped and accessible without affecting the FIFO pointers. The FIFO pointers are accessible via the CCM 210 registers. The number of modified cache sectors is the difference between a write pointer and a read pointer. On every occurrence of a write to an unmodified cached sector, the corresponding sector address will be pushed onto the FIFO. To reduce the number of modified cache entries, the FIFO content pointed to by the FIFO read pointer is read, one entry is popped out of the FIFO and by writing to the FIFO read pointer, that cache sector is moved to NAND flash memory and the corresponding tag entry is invalidated. If the algorithm decides not to evict the cache sector popped from the FIFO, the sector address may be pushed back onto the FIFO by writing the sector address to the FIFO write data register. Writing to the FIFO write data register increments the write pointer, thus increasing the number of FIFO entries by one.

There are four sources of interrupts from the cache as follows:
1. Cache Read Miss Interrupt: The read data is wrong; identify the read instruction, read access address from memory interface controller and prepare to re-try or emulate the failing instruction when Cache Replace Complete interrupt occurs. Interrupt is set on a cache miss for a read access.
2. Cache Write Miss Interrupt: The write data has been latched but is waiting for the sector to be read from NAND Flash 116. Waiting for the Cache Replace Complete interrupt prevents the current write data from being over written. Interrupt is set on a cache miss for a write access.
3. Cache Replace Complete Interrupt: This interrupt is set on the completion of cache processing. When set, the processing status should be reviewed to determine if the processing was successful, and where the sector is located. Other status bits relating to ECC should also be reviewed to determined the validity of the data. If a Cache Read Miss interrupt preceded this interrupt, then the failing instruction is retried or emulated. If the missed sector was in a write buffer 912, then the sector is serviced. If a Cache Write Miss interrupt preceded this interrupt, then the status should be checked to determine if the processing was successful. If the data is in the cache, then retry the instruction that caused the miss.
4. Modified Sector Limit Interrupt: This interrupt occurs when the number of Modified sectors needs to be reduced by writing some of the sectors to NAND Flash Interrupt, and is set when the Modified Sector count exceeds the Modified Sector Limit value. The interrupt is cleared when the Modified Sector count no longer exceeds the Modified Sector Limit value.

With the exception of the Modified Sector Limit interrupt, the clearing mechanism for all other interrupt sources and status information is a host processor 18 write to a FAILED ADDRESS 0 register. In addition, that host processor 18 write would also clear the following registers:
 FAILED ADDR0 register
 FAILED ADDR1 register
 FAILED WDATA register
 CACHE MISS COUNT register Preferably, when a Reset _n input signal is asserted because of a power fail (not the Reset switch), the AutoSave function in the cache is started when a SCM 216 "hold_mode" signal asserts. First, the directory FIFO is written in NAND at the first sectors pointed to by an AutoSave address register. Then, the tag entries associated with every sector address contained in the directory FIFO are checked. If a valid tag is found, then the sector in cache associated with the tag is written into NAND 116. If an invalid tag is found, then the associated write buffer is written into NAND 116. When all modified sectors are written into NAND 116, the CCM 210 will signal the SCM 216 by asserting the "update_done" signal and this will reset the memory controller 200.

Four AutoSave registers AUTOSAVE_BLOCK0_ADDR, AUTOSAVE_BLOCK1_ADDR, AUTOSAVE_BLOCK2_ADDR and AUTOSAVE_BLOCK3_ADDR indicate the write areas in the NAND Flash 116. These addresses point to either 128 or 256 contiguous sectors, as determined by the AUTOSAVE_DOUBLE configuration bit. The first sector always contains the Directory list which consists of up to 255 entries of 2 bytes indicating the sector numbers of NAND Flash 116 from which the modified sectors that follow originated (any unused entries in this sector will contain 0x0000—this sector address is never modified since it is part of the boot block). The remaining 127 or 255 sectors contain modified NAND Flash 116 sectors referenced in the Directory list (when the Directory list is exhausted, this ends the AutoSave write area). For 512 Mb NAND Flash 116, each tag entry represents 2 sectors and require 2 requests to the AutoBuffer for each tag entry—only 127 Modified tag entries can be saved in the allotted 8 NAND Flash 116 blocks.

The number of sectors that can be saved during AutoSave is determined by a DIR_FIFO write pointer. There are only 256 entries, and as a result the maximum number of modified sectors is 256. If at any time, the number of modified sectors exceed this number, then the DIR_FIFO write pointer will wrap, and the DIR_FIFO will become corrupted. To avoid lost of information in a software controlled cache system, software should unload the DIR_FIFO information prior to an overflow.

The system cache resides in SDRAM 118. When the host requests data that is not cached, the requested data will need to be moved from NAND flash memory to a cache location in SDRAM. In this case, the CCM 210 initiates the transaction by making a "Cache Read Request" to the RWB block 212. Along with the read request, the CCM 210 will provide the source NAND flash 116 sector address as well as the destination SDRAM 118 address.

The RWB 212 services the request by first reading one sector of data from the given NAND flash 116 sector address location and loading it into the read buffer 910. Once the source sector of data has been retrieved and no indication of an error has been received from the ECC block 324, the RWB will then initiate a write request to the SDRAM controller to transfer the contents of the read buffer 910 to SDRAM 118.

There are three possible errors that can be generated from the ECC block 324 when reading a sector of data from NAND flash 116:

ECC ERROR CORRECT: The ECC indicating that an error(s) has been detected in the last NAND flash 116 sector read and there is a corrected sector of data in an ECC read buffer 326. If the read request was initiated by the CCM 210, the RWB 212 will propagate the signal to the CCM 210. Otherwise, on a software-initiated read, the RWB 212 will set the Interrupt signal and also an ECC_CORRECT bit in a RWB-STATUS2 register. The RWB 212 will then retry the read operation by fetching the corrected data from the ECC block's read buffer 326 and reloading its local read buffer with the corrected data. Once the fetch is completed, the RWB 212 will proceed with the write request to the SDRAM controller 316 to transfer the contents of the read buffer to SDRAM 118.

ECC ERROR ABORT: The ECC indicating that errors detected in the last NAND flash 116 sector read are not correctable. If the read request was initiated by the CCM 210, the RWB 212 will propagate the signal to the CCM 210. Otherwise, on a software-initiated read, the RWB 212 will set the Interrupt signal and also an ECC_ABORT bit in the RWB-STATUS2 register. In either case, the transaction will be aborted and the data in the ECC read buffer 326 will not be transferred to SDRAM 118. If an ECC Error Correct flag is also set, the RWB 212 will reload the read b910 buffer from the ECC read buffer 326 before aborting the transaction.

ECC CHECK BIT ERROR: The ECC indicating that errors detected in spare area of the last NAND flash 116 sector read. If the read request was initiated by the CCM 210, the RWB 212 will propagate the signal to the CCM 210. Otherwise, on a software-initiated read, the RWB 212 will set the Interrupt signal and also an ECC_CBE bit in the RWB-STATUS2 register. This flag does not have any bearing on whether the MIC 200 re-reads from the ECC Read Buffer 326 or aborts the transaction.

Similarly, when the host processor 18 writes data to a location that is currently not in cache and the cache is full, modified cached data will need to be moved out of its cache location in SDRAM 118 to NAND flash memory 116. In this case, the CCM 210 initiates the transaction by making a "Cache Write Request" to the RWB 212. Along with the write request, the CCM 210 will also provide the source SDRAM address. The RWB 212 services the request by reading one sector of data from the given SDRAM address location and loading it into one of the available cache write buffers 912. The RWB 212 then signals the completion of this transfer to system software by setting the write buffer Interrupt line and a WBUF_INTR bit in the RWB-STATUS1 register.

The second stage of the transaction is initiated by software when it acknowledges and services the interrupt. In the interrupt service routine, software will indicate, via a series of register accesses, which write buffer 912 it is servicing (as there may be multiple write buffer sectors 912 awaiting transfer) and the destination sector address in NAND flash memory 116 the data is to be transferred to. These registers are located in the NAND Flash Interface Controller (NIC) 214, shown in FIG. 13. The NIC generates the protocol necessary to access raw NAND flash memory 116. Requests to access NAND flash memory 116 can originate from one of two sources, the CCM 210 or the host processor 18 via register writes. Writing to a NIC-CMD0 register initiates transaction(s) to NAND flash memory.

In addition to or in lieu of the CCM 210, the RWB 212 provides a mechanism for software to initiate the transfer of one sector's worth of data between the SDRAM 118 and NAND flash memory 116 by performing the following sequence of events:

1. Supply the SDRAM address and NAND flash address of the intended transaction by writing to the following three registers in any order: REG_SDRAM_HIGH_ADDR, REG_NAND_LOW_ADDR and REG_NAND_HIGH_ADDR.
2. Update the REG_SDRAM_LOW_ADDR register with the SDRAM low address, and the CMD type as defined. Provided that the RWB 212 is not servicing any CCM 210 requests, writing a '1' to the CMD_GO bit of this register will trigger the transfer of one sector of data between the two memory mediums.
3. When the requested transaction has completed, the RWB 212 will signal the Interrupt line and set the SWREQ_DONE bit in the RWB-STATUS2 register. Subsequent sector transfers can then be initiated by repeating the sequence.

When potential power issues are detected, the CCM 210 may decide to flush the cache to prevent loss of data. This "AutoSave" function in the CCM 210 will try to move all modified cached data from SDRAM 118 to NAND flash memory 116 before power is lost. In this case, the CCM 210 initiates each sector save by making an "AutoSave Request" to the RWB 212. This is similar to the "Cache Write Request" except that, in addition to the source SDRAM address, the CCM 210 also provides a destination NAND flash sector address. The RWB 212 services the request by loading the read buffer 910 with one sector of data from the source SDRAM address location. When completed, the RWB 212 will then initiate a write request to the NAND Flash controller 214 to transfer the contents of the read buffer 910 to NAND flash memory 118.

The Auto Load function provides a hardware-automated mechanism to move 20 sectors of data (boot code) from NAND flash memory 116 starting from sector zero into SRAM buffers. The first 4 sectors will be moved to a 1 k×16 block of SRAM external to the RWB 212, and the subsequent 16 sectors into the resident 4 k×16 Code/Write buffer. The trigger for this function is the exit of the RESET_IN input to the RWB 212. Once the Auto Load function has completed, the RWB 212 will signal to the SCM 216 that it is complete, and the SCM 216 will de-assert the RESET_OUT signal.

Thereafter, the Code Buffer will be redefined to occupy only 8 sectors. The other 8 sectors will be reallocated as the Cache Write Buffer.

The 16 sectors of code loaded into the local SRAM buffer at boot up is read and write accessible by the processor and are mapped to CS0 address 000800-0027FF (hexadecimal). CS0 address 000000-0007FF will be mapped to first 4 sectors of code loaded into the 1 k×16 block of SRAM external to the RWB 212.

During the "Auto Load" process, the data is scanned for a specific signature. The presence of data sequence "0x 4B 49 4C 4C 42 45 41 52" in sector 0 will set a One Time Programmable (OTP) flag. This flag is used to set the write and erase permissions to the boot sectors of NAND flash memory 116. As the Erase function of NAND flash memories are performed on block boundaries, the resulting permission policy will be applied to all 32 sectors of "Block 0", even if the boot code was to be defined as only residing in the first 16 sectors. The correlation of the flag settings and the resulting boot sector write/erase permissions is shown in FIG. 12.

There are two interrupt signals that originate from the RWB 212. The WBUF_INTR interrupt signals to system software that the number of write buffer sectors 912 awaiting transfer to NAND flash 116 has exceeded the value programmed into the WBUFS_TO_INTR field of the RWB-CONFIG register. When system software services the write buffer sector transfers such that the number of outstanding sectors still awaiting transfer becomes less than the programmed field, the WBUF_INTR interrupt will clear itself. The SWREQ_STATUS interrupt signals to system software that the memory sector transfer it had requested has either completed or was aborted. The interrupt service routine should read the RWB-STATUS2 register and test each of the five bits to determine the outcome of the requested transaction in order to properly service the interrupt request. The possible results are as follows:

1. OTP_ERR: A violation of the OTP permission has occurred. The requested transaction was aborted.
2. ECC_CBE: The requested transaction has completed, but an ECC check bit error has occurred One of the functions of the interrupt service routine should be to move that NAND flash sector to a different location and mark the ECC corrected sector as invalid and unavailable for future use.
3. ECC_CORR: The requested transaction has completed but an ECC correction has occurred. One of the functions of the interrupt service routine should be to move that NAND flash sector to a different location and mark the ECC corrected sector as invalid and unavailable for future use.
4. ECC_ABORT: ECC detected errors that are uncorrectable. The requested transaction was aborted. One of the functions of the interrupt service routine should be to mark the aborted NAND flash sector as invalid and unavailable for future use.
5. SWREQ_DONE: The requested transaction has completed successfully and the RWB is ready and available for subsequent requests. The SWREQ_DONE field will not be set if the transaction was completed with ECC correction. A write to the RWB-STATUS2 register will clear the contents of the register and also the SWREQ_STATUS interrupt signal to the Interrupt Controller.

Command codes are associated with the NIC 214. Preferably, the set of attribute fields associated with each command code is defined before initiating the transaction(s). The attribute field describes the nature of the transaction that is to be executed by the command code. This implementation provides the flexibility to support future or unforeseen command codes without having to make hardware changes. A list of some common command codes and its attribute settings are shown in FIG. 14.

Transaction requests to the NIC 214 originate from one of two sources, either from the CCM 210 or from the processor 18 (via register writes). The CCM 210, during runtime, will request to either read or write to NAND flash memory 116. The NIC 214 services cache read/write requests by issuing the command and attributes programmed into NIC-CC_RDCMD and the NIC-CC_WRCMD registers respectively to a timing generator. The two registers should be set up before cache requests are to occur. After that, unless ECC or OTP issues are raised during the transaction, no software intervention will be required to service CCM-initiated accesses.

The NIC 214 supports x8 and x16 parts. On system reset, a hardware initialization and self configuration routine performs a reset to NAND flash memory and an automatic detection of the memory data bus width. The bus width detection circuit requires that on reset, the memory interface controllers NAND flash interface data IO pads default to "bus hold" mode and the NIC configuration defaults to x16 mode. To determine the data bus width of the memory device, the NIC performs 16 consecutive reads starting from address location zero and compares the upper 8 bits of the data returned. If during any of the 16 reads, the most significant byte of the data differs from that of the previous read, the NIC self-configures to x16 mode. And it follows that if the MSB from the 16 reads never differs, it sets itself up in the x8 mode. It should be noted that the data bus width detection method will not work on a blank NAND flash memory 116 (i.e., one that has not previously been loaded) or any NAND flash memory 116 that is not able to change the state of its output bits. Preferably the flash memory is programmed before being installed into the data processing device 10.

The NIC-REG_WDATA register provides an alternate source of write data from the RWB write buffers 912. A page of NAND flash memory 116 can be programmed via the NIC-REG_WDATA.

The Interrupt signal in the NIC 214 can be triggered by one of two events. The interrupt service routine should poll the NIC-STATUS2 registers to determine the source of the interrupt. Generally, the interrupt will be used to signal system software that the transaction it requested has completed successfully. In this case, the CMD_DONE field would be set. Otherwise, if the transaction was aborted due to a violation of the write/erase permission set by the OTP flag, OTP_ERR will be set to indicate the nature of the violation that caused the transfer to abort. Writing to the NIC-STATUS2 register will clear all three fields.

There are four configuration registers and one status register for the SDRAM function in the SIC block 314, as shown in FIG. 16. Normally when the SDRAM 118 is not being accessed, the CKE input will be '0' to disable the clock into the SDRAM 118 to reduce power. When a read or write access occurs, the CKE input goes to '1' as soon as possible to enable the clock in the SDRAM 118 on the next positive edge of the SDRAM clock. On the following clock, a bank ACTIVE command is issued giving the bank and row address for the access. Two clocks later a READ or WRITE command is issued giving the bank and column address for the read or write access respectively.

In the case of a read, two or more clocks after the READ command, a PRECHARGE command can be issued which terminates the READ after receiving two or more words of data (providing the configuration of the SDRAM 118 is not Burst Length=1). For writes, the configuration is always a Single Location access which writes one word and then may Precharge or issue another one word write command (Burst writes require a new write data for each SDRAM clock). Various control bits determine when to Precharge the bank depending upon how soon an access to the same bank occurs and whether this access is to the same row in the bank.

When doing read or write accesses to the SDRAM 118, a bank and row are opened by an ACTIVE command, a READ or WRITE command is performed once or many times on this bank and row then the bank and row are closed by a PRE-CHARGE command. Closing banks that are no longer required can save power, however, at the same time, it unnecessarily extends access time for a subsequent access to a location in the same bank. Several options are available to configure the closing of banks to optimize a particular application for power and speed. A SIC_ACCESS_CR register contains the BURST_MODE(1:0) configuration bits to define the mode, and BANK_OPEN_TIME(2:0) to define the wait time before closing a bank. Burst mode 0 is selected when BURST_MODE(1:0)='00'. In this mode the SIC reads a minimum of 2 or 3 words (depending upon the CAS Latency of 2 or 3 clocks respectively) and closes the bank after the wait time (set by BANK_OPEN_TIME(2:0)) if no further accesses are requested to the current bank.

Burst mode 1 is selected when BURST_MODE(1:0)='01'. In this mode the SIC 314 reads words to a maximum of 8 words as long as the request to the SDRAM 118 remains asserted and closes the bank after the wait time (set by BANK_OPEN_TIME(2:0)) if no further accesses are requested to the current bank. The present MIC 200 request logic always causes 4 words to be read.

Burst mode 2 is selected when BURST_MODE(1:0)='10'. In this mode the SIC 314 reads words up to the burst length of 8. The SDRAM 118 must be configured to burst length of 8 words via the SIC_LOAD_MODE register. The bank is then closed after the wait time (set by BANK_OPEN_TIME(2:0)) if no further accesses are requested to the current bank.

Burst mode 3 is selected when BURST_MODE(1:0)='11'. In this mode the SIC reads words up to the burst length of 8. The SDRAM 118 must be configured to burst length of 8 words via the SIC_LOAD_MODE register. The bank is then closed after the wait time (set by BANK_OPEN_TIME(2:0)) if no further accesses are requested to the current bank. When MIC or CCM accesses are interleaving with a RWB access (read or write of 128 words), the bank for MIC or CCM and the bank for RWB when different are not closed after each access. When the banks are different, this can reduced the interleaving overhead by not precharging and activating the same banks.

The SDRAM 118 requires that every Row of the memory be refreshed every 64 milliseconds. The 64 Mb and 128 Mb SDRAM have 4096 rows to refresh and the 256 Mb and 512 Mb SDRAM have 8192 rows. For non-burst refresh, there is one auto refresh command every 15.6 microseconds (us) which is configured by setting the Refresh Cycle Time(9:0)=202 (decimal value of the CLKIN cycles at 13 MHz) or Refresh Cycle Time(9:0)=101 (decimal) for 7.8 us with the 256 Mb SDRAM. The non-burst refresh is used when the processor interface can use nWAIT to extend the access time while waiting for a refresh to complete. The configuration settings for non-burst mode is Refresh Mode (SIC_REFRESH_CR bit 10)='0', with the appropriate Refresh Cycle Length and Refresh Clock Length for the SDRAM being used. The value of Hidden Access Priority (SIC_REFRESH_CR bit 12) is not used in this case.

When the processor interface does not have nWAIT to extend the access time and MUST supply the read data within a fixed number of clock cycles, the AutoRefresh cycles must be hidden such that the SDRAM 118 is always available to read the requested location. The idea is to always read 2 consecutive words of data (burst operations require only 1 extra clock for data word after the first) from the SDRAM 118 for each access. If the processor interface gets a request for the second word of data that has been read, a free cycle is available to perform an AutoRefresh cycle or other pending read/write operation to the SDRAM 118. For this the Refresh Mode (SIC_REFRESH_CR bit 10)='1' and Refresh Interval (9:0) becomes a 64 millisecond timer. The Refresh Interval (9:0) counter is set to 202 (decimal) for the number of CLKIN cycles (13 MHz) times 4098 (decimal). AutoRefresh cycles are performed when possible until 4096 or 8192 (depending upon the Refresh Cycle Length value) refreshes have occurred since the last Refresh Interval timeout. The Hidden Access Priority (SIC_REFRESH_CR bit 12) determines whether an AutoRefresh or RWB request has priority until the Refresh Interval timeout which makes AutoRefresh the higher priority until the Refresh Cycle Length is complete. When the RWB requests have priority, it is recommended that the Refresh Interval timer be reduced to allow the Refresh Cycle Length to complete within the 64 millisecond time limit. As in non-burst refresh, the Refresh Clock Length must be set to match the SDRAM requirements. When Refresh Mode (SIC_REFRESH_CR bit 10)='1', Bank Open Time and Burst Mode bits (SIC_ACCESS_CR bits 6:4, 3:2) are forced to "000" and "00" respectively.

In a further embodiment, mobile SDRAM chips 118 have 2 mode registers, the Mode Register to set CAS latency, Burst mode, type and length and an Extended Mode Register to set Self Refresh Coverage and Operating Temperature. The SDRAM Mode registers are set writing to the SIC_LOAD_MODE register which has a Command Start, Command Type and 14 configuration bits BA(1:0),A(11:0) which load into the SDRAM through the Bank Address and Address bits. Setting the Command Start and Command Type bits initiate the Mode Register load operation through the SDRAM Interface to the SDRAM chip using a Load Mode Register command. When the command has completed, the Command Start bit will read back '0'. A separate command is required for each of the Mode Register and Extended Mode Register writes as defined in the SDRAM data sheet. Following the Load Mode Register commands, an extra command is used with Command Type bit='0' and Bit 13='0', to transition from Load Mode to Normal operational mode. At anytime when the SDRAM is Idle, the above sequence may be repeated to change the Mode Register.

The same method that writes the Mode registers is used to enter or exit the Self Refresh mode by setting the Command Start bit with the Command Type bit='0' and Bit 13='1'. The lower 13 bits of the SIC_LOAD_MODE register are not used to enter or exit Self Refresh. Each time that this command is executed, the Self Refresh mode toggles. The current Self Refresh state can be determined by reading SDRAM_CONTROL_STATUS bit 0.

Various embodiments of the memory controller interface having been thus described in detail by way of example, it will be apparent to those skilled in the art that variations and modifications may be made without departing from the invention.

We claim:

1. A method, comprising:
   receiving at a memory controller interface an access request for data stored in a NAND flash component in communication with the memory controller interface, said access request being received from a processor designed to support NOR flash and static random access memory (SRAM) components;
   identifying at the memory controller interface a sector of the NAND flash component comprising the requested data;
   checking at least one tag entry at the memory controller interface to determine if the data of the identified sector had been previously stored in a cache provided by a synchronous dynamic random access memory (SDRAM) component in communication with said memory controller interface;
   if the data of the identified sector had not been previously stored in the cache, then:
      reading the requested data from the NAND flash component;
      writing the requested data to the cache; and
   responding to the access request by reading the data corresponding to the identified sector from the cache.

2. The method of claim 1, further comprising, if the data of the identified sector had not been previously stored in the cache:
   determining whether space is available in the cache to write the requested data to the cache;
   if cache space is available, writing the requested data in an available sector of the cache;
   if cache space is not available, checking at least one tag entry at the memory controller interface to determine if data in a sector of the cache is unmodified; and
   if a cache sector of unmodified data is identified, overwriting the cache sector with the requested data.

3. The method of claim 2, further comprising, if cache space is not available and no cache sector of unmodified data is identified:
   reading out one or more sectors of modified data from the cache and writing said modified data to the corresponding sectors of the NAND flash component; and
   overwriting at least one of said cache sectors with the requested data.

4. The method of claim 1, further comprising:
   in response to a request from said processor, modifying data stored in an identified sector of the cache; and
   writing the modified data to the NAND flash component.

5. The method of claim 4, further comprising:
   when data stored in an identified sector of the cache is modified, setting at the memory controller interface a tag entry corresponding to the identified cache sector to indicate that the data has been modified;
   when the modified data is written to the NAND flash, setting said tag entry corresponding to the identified cache sector to indicate that the data has not been modified.

6. The method of claim 5, wherein writing the modified data to the NAND flash component occurs when:
   all cache sectors contain modified data;
   a loss of power is detected;
   an autosave procedure is initiated; or
   the processor requests that modified data be written from the cache to the NAND flash component.

7. The method of claim 1, further comprising performing error correction coding on the requested data read from the NAND flash component.

8. The method of claim 1 wherein receiving the access request comprises receiving a request for boot code stored in the NAND flash, the method further comprising:
   scanning the requested boot code for a predetermined signature;
   if the predetermined signature is found, designating at least a portion of the NAND flash to be read only.

9. The method of claim 8 wherein receiving the access request is preceded by a power on reset.

10. A data processing device comprising a memory controller interface configured to carry out the method of claim 1.

11. A data processing device comprising a memory controller interface configured to carry out the method of claim 2.

12. A data processing device comprising a memory controller interface configured to carry out the method of claim 3.

13. A data processing device comprising a memory controller interface configured to carry out the method of claim 4.

14. A data processing device comprising a memory controller interface configured to carry out the method of claim 5.

15. A data processing device comprising a memory controller interface configured to carry out the method of claim 6.

16. A data processing device comprising a memory controller interface configured to carry out the method of claim 8.

17. A data processing device comprising a memory controller interface configured to carry out the method of claim 9.

* * * * *

UNITED STATES PATENT AND TRADEMARK OFFICE
CERTIFICATE OF CORRECTION

| | | |
|---|---|---|
| PATENT NO. | : 8,086,788 B2 | Page 1 of 1 |
| APPLICATION NO. | : 12/559133 | |
| DATED | : December 27, 2011 | |
| INVENTOR(S) | : Jerrold R. Randell et al. | |

It is certified that error appears in the above-identified patent and that said Letters Patent is hereby corrected as shown below:

Title Page, Item (75) 3rd named inventor's name should read "Karin Alicia Werder".

Signed and Sealed this
Twentieth Day of March, 2012

David J. Kappos
*Director of the United States Patent and Trademark Office*